United States Patent
Ando et al.

(10) Patent No.: US 8,827,851 B2
(45) Date of Patent: Sep. 9, 2014

(54) POWER TRANSMISSION BELT AND METHOD OF PRODUCING THE SAME

(75) Inventors: Satoru Ando, Nagoya (JP); Yoshikazu Ishii, Okazaki (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 15 days.

(21) Appl. No.: 13/641,330

(22) PCT Filed: Apr. 28, 2010

(86) PCT No.: PCT/JP2010/003046
§ 371 (c)(1),
(2), (4) Date: Oct. 15, 2012

(87) PCT Pub. No.: WO2011/135625
PCT Pub. Date: Nov. 3, 2011

(65) Prior Publication Data
US 2013/0040772 A1    Feb. 14, 2013

(51) Int. Cl.
*F16G 5/16* (2006.01)
*B23P 11/00* (2006.01)

(52) U.S. Cl.
USPC .................................... 474/265; 29/428

(58) Field of Classification Search
CPC ........................................................ F16G 5/16
USPC .................. 474/200–265; 29/428, 434
See application file for complete search history.

(56) References Cited

U.S. PATENT DOCUMENTS

| | | | |
|---|---|---|---|
| 6,578,249 B2* | 6/2003 | Fujioka | 29/434 |
| 2007/0072721 A1* | 3/2007 | Takagi et al. | 474/242 |
| 2009/0280940 A1* | 11/2009 | Toyohara et al. | 474/242 |
| 2011/0244999 A1* | 10/2011 | Nakamura et al. | 474/91 |
| 2012/0190490 A1* | 7/2012 | Morino et al. | 474/240 |
| 2012/0208663 A1* | 8/2012 | Yamanaka et al. | 474/240 |

FOREIGN PATENT DOCUMENTS

| | | |
|---|---|---|
| JP | 58 81252 | 5/1983 |
| JP | 9 14357 | 1/1997 |
| JP | 2001 330535 | 11/2001 |
| JP | 2002 235810 | 8/2002 |
| JP | 2006 192459 | 7/2006 |
| JP | 2006-266363 | 10/2006 |

OTHER PUBLICATIONS

International Search Report Issued Jun. 8, 2010 in PCT/JP10/03046 Filed Apr. 28, 2010.

* cited by examiner

*Primary Examiner* — William E Dondero
*Assistant Examiner* — Robert T Reese
(74) *Attorney, Agent, or Firm* — Oblon, Spivak, McClelland, Maier & Neustadt, L.L.P.

(57) ABSTRACT

To provide a power transmission belt and a method of producing the same that allows lightweight elements to be produced at low cost and allows the durability to be sufficiently ensured, the power transmission belt includes a plurality of elements each having both side end surface portions, a rocking edge portion rockably engaged with either one of a pair of other elements neighboring the element, and a concave-convex engagement portion engageable with the pair of other elements, in which each of the elements has a plate-like portion, a first convex portion projecting from one surface of the plate-like portion, and a second convex portion projecting from the one surface of the plate-like portion in a spaced relationship with the first convex portion to constitute the rocking edge portion, and each of the elements is engaged with the pair of other elements so as to press against one another by the first convex portion and the second convex portion.

12 Claims, 12 Drawing Sheets

PRESS WORKING STEP
(CONVEX FORMING PUNCHING STEP)

STACKING STEP
(STACKING STEP OF WORKPIECES)

THICKNESS ADJUSTING STEP
(PLASTICALLY DEFORMING
STEP OF CONVEX PORTION)

MEASURING STEP
(MEASURING STEP OF
DIMENSION DIFFERENCE ON
BOTH SIDES OF WORKPIECES
IN BELT WIDTH DIRECTION)

POWER TRANSMISSION BELT AND METHOD OF PRODUCING THE SAME

TECHNICAL FIELD

The present invention relates to a power transmission belt and a method of producing the same, and in particular to a power transmission belt preferable for a belt type continuously variable transmission and a method of producing the same.

BACKGROUND ART

There has so far been known a belt type transmission apparatus as a vehicular continuously variable transmission (hereinafter simply referred to as a "CVT"). The belt type transmission apparatus comprises a drive side pulley and a driven side pulley respectively serving as movable sheaves, and an endless power transmission belt passing over the drive side pulley and the driven side pulley. The power transmission belt to be used for such a CVT is constituted by an endless band-like ring serving as a core material, and a multiplicity of elements each having a thickness in the axial direction of the endless band-like ring and retained by the endless band-like ring. The elements are subject to being pressed toward the axial direction of the endless band-like ring, and serve to impart tensions to the endless band-like ring, thereby allowing a torque to be transmitted from the drive side pulley to the driven side pulley.

As one typical example of power transmission belt, there have so far been used many power transmission belts each of which comprises a multiplicity of elements each formed with a pair of left and right concave portions open toward both sides of the element in the width direction of the power transmission belt, and a pair of endless band-like rings respectively received in the concave portions to ensure that the multiplicity of elements are held between the pair of endless band-like rings. In this kind of the power transmission belt, each of the elements has one surface side formed with a rocking edge so that the neighboring elements can relatively be rocked in the state that the plurality of elements are held in contact with the preceding elements by the rocking edges intervening therebetween when the transmission belt is wound on each of the pulleys. In order to efficiently produce the elements of the power transmission belt such as those previously mentioned, there has so far been known (see, for example, Patent Document 1) a method of efficiently producing the elements through the steps of preparing a steel plate in a band-like form (hereinafter simply referred to as a roughly formed material) subjected to a roll work so that stepped portions having different thicknesses are formed between a central portion and end portions in the width direction thereof, and sequentially punching the elements from the roughly formed material at the position where the stepped portion comes to the rocking edge.

In the case that each of the elements thus produced is deemed to be disqualified in flatness level, both of neighboring stacked elements cannot be brought into tight contact with each other, thereby making it difficult to have the elements assembled with the rings and further leading to uneven gaps each formed between the neighboring stacked elements. This results in decreased power transmission efficiency between the drive side pulley and the driven side pulley by the power transmission belt. In view of this problem, there has so far been known a method of producing the elements through a step of determining whether or not each of the elements is disqualified in flatness level with distortion and bending thereon by determining if there is a change more than a predetermined contraction amount in the overall length of the stacked elements when different inspection loads of large and small are applied to the elements in a stacked condition. (see, for example, Patent Document 2).

CITATION LIST

Patent Literature

{Patent Document 1}
Japanese Patent Application Publication No. 2006-192459 (see FIGS. 6 and 13)
{Patent Document 2}
Japanese Patent Application Publication No. 2001-330535

SUMMARY OF INVENTION

Technical Problem

The conventional power transmission belt and method of producing the same by punching the elements from the band-like roughly formed material as mentioned above, however, encounters such a problem that there is an opening formed by punching a preceding element on at least one side in the feed direction of the material with respect to the punching portion of the element when punching an element from the roughly formed material with a punching die. The opening is positioned close to the punching position for the necessity of enhancing a yield rate of the material. This tends to cause variation in the thickness of the element on both sides in the width direction of the power transmission belt which corresponds to the feed direction of the material in punching step. This can further lead to a relatively large difference in the thickness among the elements of different work lots in which the variation in the thickness of the roughly formed material itself may result. While the variation in the thickness of the element on both sides in the width direction of the power transmission belt is very small individually, the variation here is, for example, in a degree of an accumulated error exceeding 0.4 millimeters when 400 pieces of elements are stacked.

The fact that the roughly formed material formed with stepped portions corresponding to the rocking edge by roll work and such is prepared from a band-like steel plate and then the elements are punched out from the roughly formed material makes the manufacturing cost of the element high. Furthermore, the thickness of a substantial portion of the element is enlarged, thereby making it difficult to reduce the weight of the power transmission belt. The issue of the variance in the thickness of the element on both sides in the belt width direction can be resolved by increasing the distance between the elements punched out from the roughly formed material. In this case, however, the yield rate of the material is lowered, thereby leading to an increase in the manufacturing cost of the element even in the punching step.

Meanwhile, in the conventional method of producing a power transmission belt in which it is determined whether or not the elements are of disqualified in flatness based on the changes in the contraction of the overall length of stacked elements being subjected to the different inspection loads of large and small, there is a high possibility that, even if there are a substantial number of good elements which do not have any distortion or warp when they are inspected individually being included in a set of stacked elements, they are determined to be defective. On the other hand, there is a high possibility that the elements of large distortion or warp included in a set of stacked elements determined good are used as good elements. This leads to an increase in the incidence of defective elements, resulting in a higher manufacturing cost of the power transmission belt and deterioration in durability of the belt type continuously variable transmission assembled with the power transmission belt due to edge contact of the elements with the transmission pulleys. Moreover, in determining whether or not the elements are of disqualified in flatness based on the changes in the contraction of the overall length of the stacked elements being subjected to the different inspection loads of large and small, it is not possible to determine good or bad for the variation in the thickness of the element on both sides in the belt width direction mentioned above.

The present invention has been made to solve such conventional problems as previously mentioned. It is therefore an object of the present invention to provide a power transmission belt that allows a lightweight element to be produced at low cost and sufficient durability of a belt type power transmission mechanism to be ensured, and a method of producing the same.

Solution to Problem

In order to solve the above problems, a power transmission belt according to the present invention (1) comprises an endless band-like ring, and a plurality of elements stacked and bonded in pressable relationship with one another through the endless band-like ring, each of the elements, respectively, having both side end surface portions at its both ends in the belt width direction to be held in pressing engagement with pulleys, a rocking edge portion rockably engaged with either one of a pair of other elements adjacent to the both side surfaces of the element, and a concave-convex engagement portion engageable in concave and convex relationship with the pair of other elements, each of the elements including a plate-like portion having the both side end surface portions, a first convex portion projecting from one surface of the plate-like portion toward either one of the pair of other elements, and a second convex portion projecting from the one surface of the plate-like portion in spaced relationship with the first convex portion to constitute the rocking edge portion, each of the elements and the pair of other elements being engaged in pressable relationship with one another by the first convex portion and the second convex portion.

In the power transmission belt thus constructed, when transmitting power between the pulleys by the power transmission belt, the elements are engaged to press against one another by at least one of the first convex portion or the second convex portion at a rectilinear section where the elements are lined in parallel with one another, and the elements are engaged to press against one another by the second convex portion that is the rocking edge portion in the section where the elements are held in pressed engagement with the pulleys while being rockably engaged with one another. Accordingly, even when the variation in the thickness of the plate-like portion of the element is likely to occur, forming the first convex portion and the second convex portion into required heights by high-precision press makes it possible to sufficiently reduce the difference in the thickness between both sides of the element in the belt width direction. Further, the fact that it is not necessary to make the thickness of the plate-like portion as thick as the rocking edge portion allows the weight of the power transmission belt to be easily reduced. In addition, because the neighboring elements are engaged to press against one another by the first convex portion and the second convex portion when the elements are stacked, it makes it possible to produce the elements of different heights from the material of the same thickness by appropriately setting the projection heights of the first convex portion and the second convex portion.

In the power transmission belt according to the present invention, (2) the projection height of the first convex portion from the one surface of the plate-like portion is preferably larger than the projection height of the second convex portion from the one surface of the plate-like portion. By the construction above, the first convex portion can be used to serve as a convex portion of the concave-convex engagement portion. Further, the first convex portion can support the pressing force between the elements at the rectilinear section of the power transmission belt where the elements are in parallel with one another.

It is preferable that (3) the plate-like portion has a first concave portion formed behind the first convex portion, the first concave portion having a depth from the other surface of the plate-like portion smaller than the projection height of the first convex portion, the concave-convex engagement portion being constituted by the first convex portion and the first concave portion. By the construction above, the first convex portion can be used to serve as a convex portion of the concave-convex engagement portion that supports the pressing force in the section where the elements are in parallel and in pressing contact with one another. This stabilizes the operating point of the pressing force, thereby allowing the power to be stably transmitted.

In the power transmission belt according to the present invention, it is preferable that (4) each of the elements has a head portion having the first convex portion, a body portion having the second convex portion, and a neck portion connecting the head portion and the body portion, at least one of the first convex portion and the second convex portion being in a rib shape extending in the belt width direction. By the construction above, it is possible to effectively prevent the elements from being inclined to be close to one another at one end thereof in the belt width direction and to be away from one another at the other end.

In the power transmission belt according to the present invention, (5) each of the elements may have a head portion having the first convex portion, a body portion having the second convex portion, and a neck portion connecting the head portion and the body portion, at least one of the first convex portion and the second convex portion may be constituted by a plurality of projections spaced apart from one another in the belt width direction. In this case, it is also possible to effectively prevent the elements from being inclined to be close to one another on one end thereof in the belt width direction and to be away from one another on the other end.

In the power transmission belt according to the present invention, it is desirable that (6) the plate-like portion has a second concave portion behind the second convex portion and corresponding to the second convex portion, the second concave portion having an opening width in the direction in which the first convex portion is spaced apart from the second convex portion, the opening width of the second concave portion being smaller than the width of the second convex portion at least in the same direction as the direction in which the first convex portion is spaced apart from the second convex portion. By the construction above, even if the thickness of the plate-like portion is small, forming the second concave portion can secure the required projection height of the second convex portion and can make the second convex portion be engaged to press against the other neighboring element in the vicinity of the second concave portion.

In this case, it is preferable that (7) the second convex portion is in a rib shape extending in the belt width direction, and the second concave portion is in a groove shape extending in the belt width direction. By the construction above, the rocking edge portion is formed in a wide range in the belt width direction by the second convex portion where the variation and difference in the thickness on both sides in the belt width direction are reduced. This allows the elements to stably rock when the belt is wound around the pulley and to stably transmit the pressing force between the elements when the belt is going straight, whereby the durability of the power transmission belt and the transmission mechanism by the edge contact and such can be prevented from being deteriorated.

Alternatively, it is also preferable that (8) the second convex portion is constituted by a plurality of projections spaced apart from one another in the belt width direction, and the second concave portion is constituted by a plurality of concave portions spaced apart from one another in the belt width direction. By the construction above, similarly to the case where the rocking edge portion is formed in a wide range in the belt width direction, this allows the elements to stably rock when the belt is wound around the pulley and the pressing force to be stably transmitted between the elements. Further, this allows a compression load that is applied to the stacked elements in a thickness adjusting step to be small.

In the power transmission belt according to the present invention, (9) each of the elements has an engagement portion formed at the end portion opposite to the first convex portion with respect to the rocking edge portion and engageable with the pair of other elements when the elements rock so as to wind around each of the pulleys, the engagement portion having one surface inclined with respect to the one surface of the plate-like portion. By the construction above, even if the projection height of the second convex portion is small, a maximum inclination angle between the neighboring elements when the elements are wound around the pulley can be set large, and thus it allows the belt to be adequately wound around the pulley even when the radius of winding is small.

In order to solve the above problems, a method of producing a power transmission belt according to the present invention (10) including an endless band-like ring, and a plurality of elements stacked in the thickness direction thereof along the endless band-like ring and assembled with the endless band-like ring to be rockable in the thickness direction thereof, each of the elements being formed with a rocking edge portion rockably engaged with either one of a pair of other elements neighboring both end surfaces of the element, and a concave-convex engagement portion engageable in concave and convex relationship with the pair of other elements, the method comprises a press shaping step of punching a plate-like portion having both side end portions from a plate-like material, and forming a first convex portion projecting from one surface of the plate-like portion toward either one of the pair of other elements and a second convex portion projecting from the one surface of the plate-like portion in spaced relationship with the first convex portion to constitute the rocking edge portion.

By the construction above, appropriately setting the projection heights of the first convex portion and the second convex portion allows the elements of different thicknesses to be produced from the material of the same thickness. Further, applying to the workpieces, i.e., the plurality of elements stacked after punching (hereinafter, referred to as stacked elements) a compression load of substantially larger than a pressing load between the elements after assembled but relatively small in a degree that can adjust the projection height of the first convex portion and/or the second convex portion makes it possible to reduce the difference in the thickness of the elements on both sides in the belt width direction as well as achieving the thickness of the elements to be uniform.

The method of producing a power transmission belt according to the present invention (11) preferably further include a thickness adjusting step of stacking a plurality of workpieces formed with the first convex portion and the second convex portion on the plate-like portion in the press forming step, applying to the plurality of stacked workpieces a compression load capable of partly plastically deforming at least one of the first convex portion and the second convex portion, and adjusting the thickness of the stacked workpieces within a predetermined thickness range. Consequently, the problems such that a set of stacked elements which may include a substantial number of good elements when they are inspected individually is determined defective or a set of stacked elements that is determined good may include a substantial number of elements defective in thickness can be eliminated. This reduces the incidence ratio of defective elements, thereby resulting in the reduction of manufacturing cost of the power transmission belt as well as preventing the deterioration in durability of the belt type continuously variable transmission assembled with the power transmission belt due to edge contact and such of the elements with the transmission pulleys.

Further, it is desirable that (12) the thickness adjusting step further includes measuring the thicknesses of the stacked workpieces at the both sides thereof in the belt width direction, and applying the compression load to the stacked workpieces so that a difference between the thicknesses of the stacked workpieces at the both sides thereof is within a predetermined allowable range. By the construction above, the difference in the thickness of the elements on both sides in the belt width direction can surely be reduced.

In the method of producing a power transmission belt according to the present invention, it is preferable that (13) the press forming step further includes forming a second concave portion behind the second convex portion, the second concave portion having an opening width in a direction in which the first convex portion is spaced apart from the second convex portion, the opening width of the second concave portion being smaller than the width of the second convex portion in the same direction as the direction in which the first convex portion is spaced apart from the second convex portion. By the construction above, an edge portion of the opening of the second concave portion and the rear surface of the second convex portion that is the surface to be pressed can be defined into required shapes and positions at the same time as the second concave portion, thereby making it possible to appropriately set the rocking fulcrum of the element.

In the press forming step, the first convex portion and the second convex portion are desirably formed within a setting area of the plate-like portion of the element to be punched out of the plate-like material before completing the punching of the plate-like portion of the element from the plate-like material. By the construction above, the first convex portion and the second convex portion can be formed easily with high precision.

Advantageous Effects of Invention

The power transmission belt according to the present invention can form the first convex portion and the second convex portion into required heights, thereby sufficiently reducing the difference in the thickness of the element on both sides in the belt width direction, and easily reducing the weight of the power transmission belt because it is not necessary to make the thickness of the plate-like portion as thick as the height of the rocking edge portion, even when the variation in the thickness of the plate-like portion of the element is likely to occur. As a consequence, the lightweight element can be produced at low cost, and the power transmission belt that can sufficiently ensure the durability of the belt type power transmission mechanism can be provided.

The method of producing a power transmission belt according to the present invention can appropriately set the projection heights of the first convex portion and the second convex portion, thereby producing the elements in different thicknesses from the material of the same thickness. Furthermore, applying a compression load of substantially larger than a pressing load between the elements after assembled but in a degree that the projection height of the first convex portion and/or the second convex portion can be adjusted to the stacked workpieces of the multiple elements after punching makes it possible to reduce the difference in the thickness of the elements on both sides in the belt width direction and to achieve the thickness of the elements to be uniform. Consequently, the lightweight elements can be produced at low cost. Further, the method of producing the power transmission belt that can sufficiently ensure the durability of a belt type power transmission mechanism can be realized.

DESCRIPTION OF EMBODIMENTS

The preferred embodiments of the present invention will be described hereinafter with reference to the drawings.

(First Embodiment)

FIGS. 1 to 3 show a power transmission belt and a plurality of elements forming part of the transmission elements according to the first embodiment of the present invention. The present embodiment is an exemplary embodiment in which the invention is exemplified to be applied to a power transmission belt constituting a belt type continuously variable transmission of an automotive vehicle.

The construction of the power transmission belt will firstly be described.

Figure 2A:
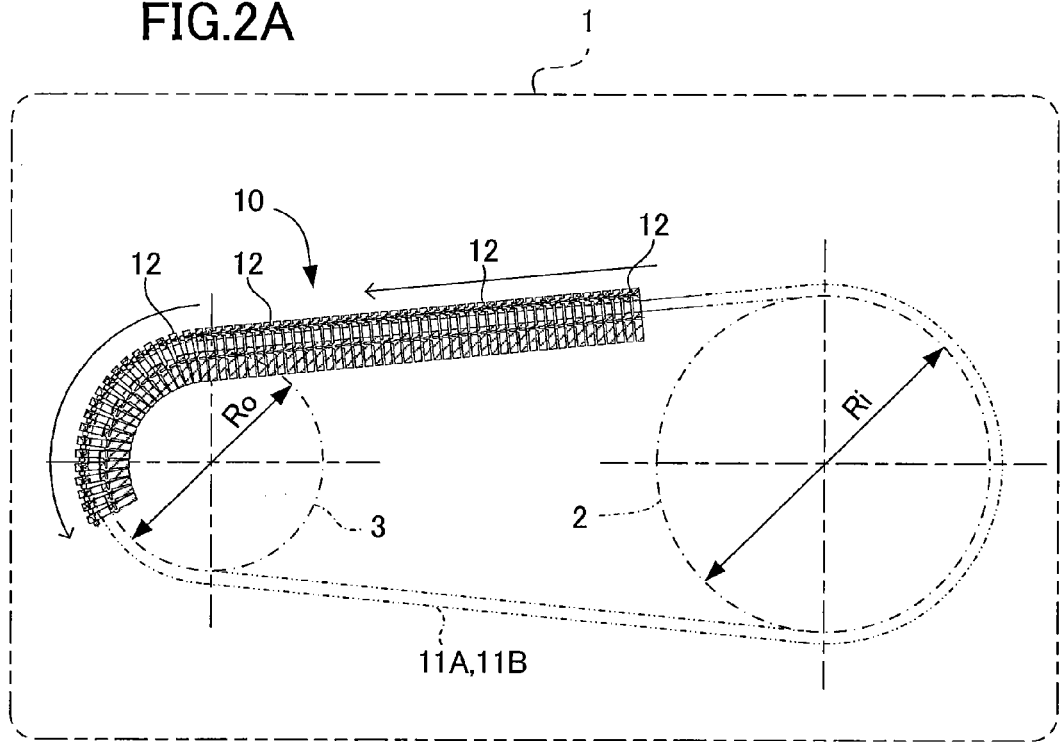
FIG. 2A is a side cross-sectional view, partly cross-sectioned, of the power transmission belt according to the first embodiment of the present invention and showing a state having a plurality of elements stacked.
Figure 2B:
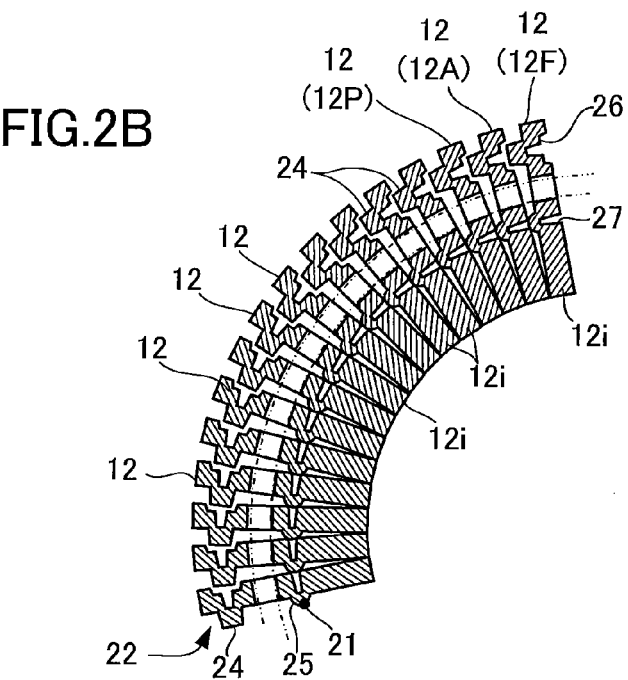
FIG. 2B is an enlarged view, partly cross-sectioned, of the power transmission belt shown in FIG. 2A.

As shown in FIGS. 2A and 2B, a power transmission belt 10 according to the present embodiment is made of metal and provided in a continuously variable transmission 1 (not shown in detail). The continuously variable transmission 1 comprises a primary pulley 2 (drive side pulley) connected with an input shaft not shown, a secondary pulley 3 (driven side pulley) connected with an output shaft not shown, and the power transmission belt 10 looped around the both pulleys 2 and 3.

The primary pulley 2 (drive side pulley) and the secondary pulley 3 (driven side pulley) are not shown in detail, and each comprises a fixed side rotation member and a movable side rotation member coupled together to form a belt engagement groove in a roughly V-shape in cross-section, and a hydraulic actuator for axially moving the movable side rotation member with respect to the fixed side rotation member to vary the width of the belt engagement groove. This means that each of the primary pulley 2 and the secondary pulley 3 constitutes a variable sheave.

The primary pulley 2 and the secondary pulley 3 are operated by controlling the hydraulic actuators with a hydraulic control apparatus out of the drawings so that a speed change ratio, i.e., a ratio (Ro/Ri) of the effective diameter of the secondary pulley 3 (effective diameter Ro of the output side variable sheave) with respect to the effective diameter of the primary pulley 2 (effective diameter Ri of the input side variable sheave) can be variable controlled continuously.

The operation oil pressures of the hydraulic actuators for the primary pulley 2 and the secondary pulley 3 are controlled by the hydraulic control apparatus so that the primary pulley 2 and the secondary pulley 3 can impart to the power transmission belt 10 an appropriate clamping force not to cause a slip.

Figure 1A:
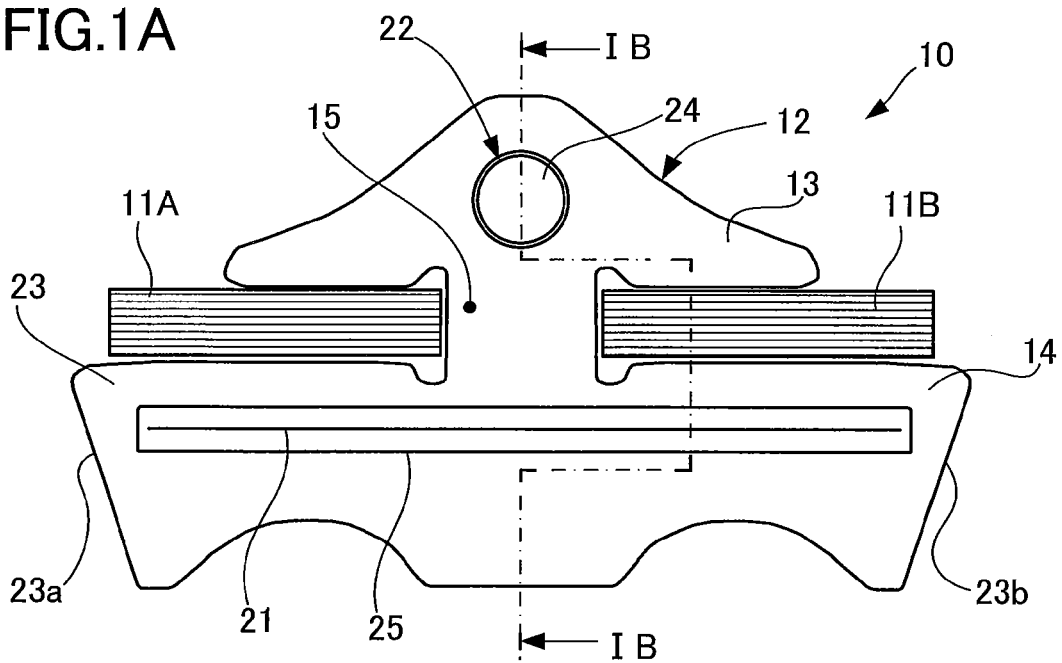
FIG. 1A is a front view of an element forming part of a power transmission belt according to the first embodiment of the present invention.
Figure 1B:
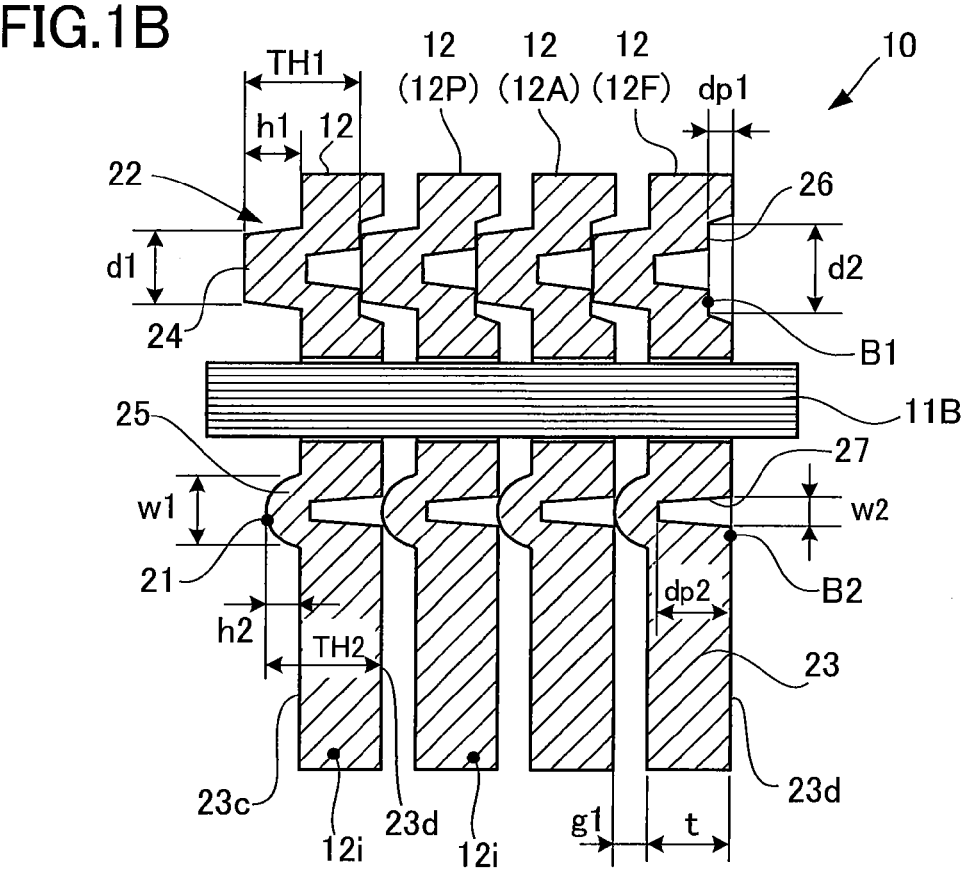
FIG. 1B is a cross-sectional view taken along the line IB-IB of FIG. 1A and seen in the direction shown by arrows from the line IB-IB.

As shown in FIGS. 1A and 1B, the power transmission belt 10 comprises at least one endless band-like ring, for example, two endless band-like rings 11A, 11B arranged in parallel rows, and a plurality of elements 12 each formed in a plate-like shape and stacked and bonded via the endless band-like rings 11A, 11B to press against one another in the state that the elements are stacked in the thickness direction thereof along the endless band-like rings 11A, 11B and are rockably and slidably assembled with the endless band-like rings 11A, 11B.

The endless band-like rings 11A, 11B are each constructed as stacked rings by stacking a plurality of ribbon-like members made of metal such as maraging steel. The endless band-like rings 11A, 11B are the same in shapes and characteristic features.

The elements 12 are each produced by punching a relatively hard steel plate such as for example a tool steel plate into a profile shape shown in FIG. 1A to have a rocking edge portion 21, a concave-convex engagement portion 22, and both side end surface portions 23a, 23b all of which are formed into precise shapes. Therefore, the elements 12 are each produced by press work that renders precise composite forming such as fine blanking. The both side end surface portions 23a, 23b of the element 12 are adapted to be clamped by the primary pulley 2 and the secondary pulley 3 at both ends of the power transmission belt 10 in the width direction thereof, i.e., left and right direction in FIG. 1 (hereinafter, simply referred to as belt width direction), at two curved sections of the power transmission belt 10 in which the respective parts of the power transmission belt 10 are wound around the primary pulley 2 and the secondary pulley 3.

Figure 3A:
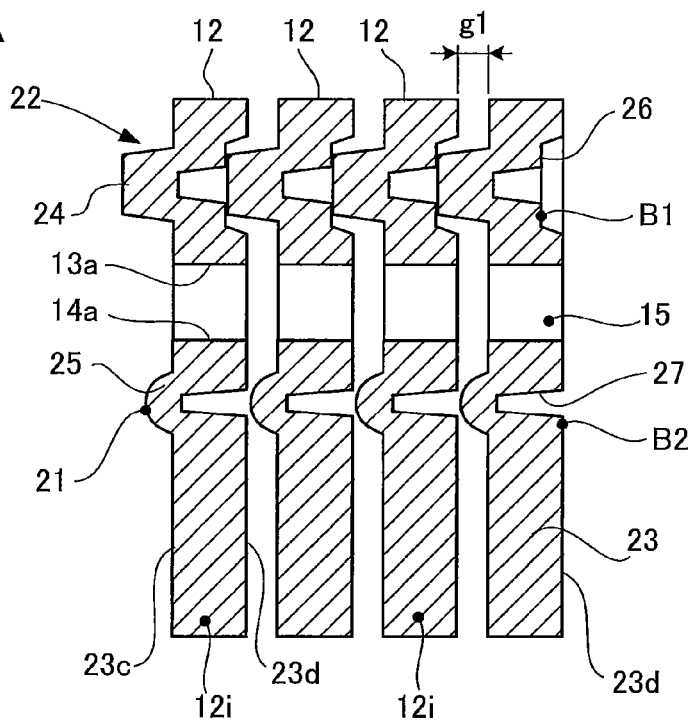
FIG. 3A is a side cross-sectional view of a part of the power transmission belt according to the first embodiment of the present invention and showing a plurality of elements in the assembled state at a rectilinear section where the power transmission belt advances straight.
Figure 3B:
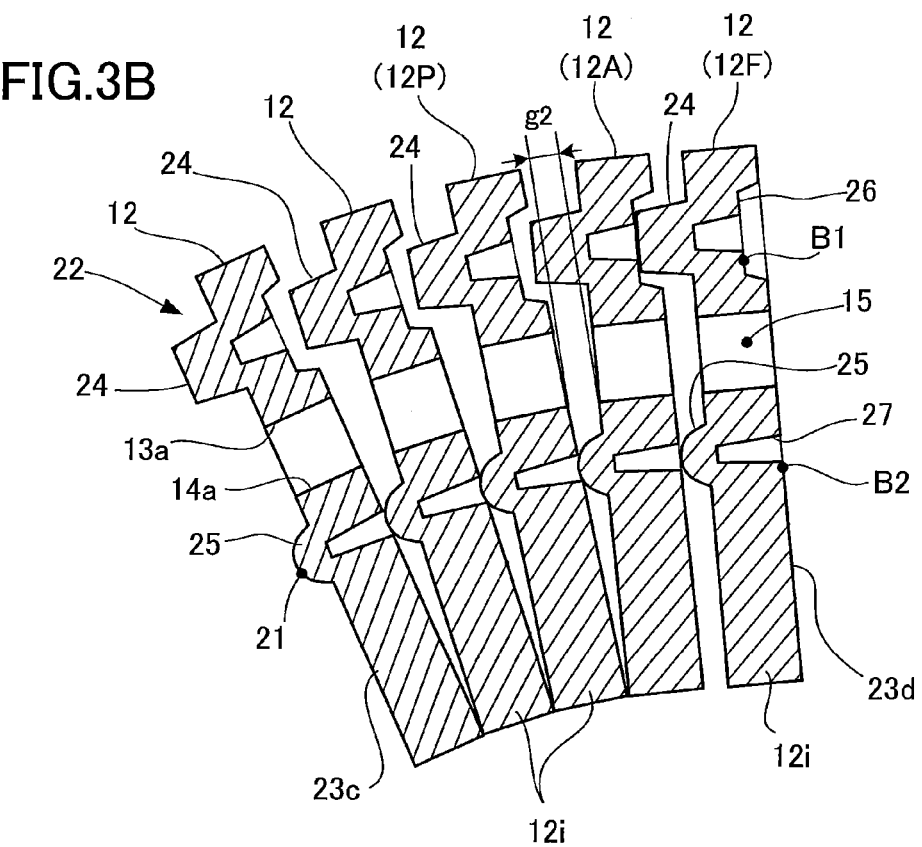
FIG. 3B is a side cross-sectional view of a part of the power transmission belt according to the first embodiment of the present invention and showing a plurality of elements in the assembled state at a curved section where the power transmission belt is wound around a pulley.

As shown in FIGS. 3A and 3B, each of the elements 12 is formed as exemplified by an arbitrary element 12A to have a plate-like portion 23 having both side end surface portions 23a, 23b, a first convex portion 24 projecting from one surface 23c of the plate-like portion 23 towards either one of a pair of other elements 12P, 12F neighboring the forward and rear surfaces 23c, 23d of the plate-like portion 23, and a second convex portion 25 projecting from the one surface 23c of the plate-like portion 23 in a spaced relationship with the first convex portion 24 to constitute a rocking edge portion 21. Each of the elements 12, an arbitrary element 12A, is arranged to engage with a pair of other elements 12P, 12F in such a manner that each of the elements 12 is allowed to press against one another by the first convex portion 24 and the second convex portion 25 thereof.

As shown in FIG. 1B, the projection height h1 of the first convex portion 24 from the one surface 23c of the plate-like portion 23 is larger than the projection height h2 of the second convex portion 25 from the one surface 23c of the plate-like portion 23. The projection height h1 of the first convex portion 24 is shown as being somewhat smaller than the plate thickness t (see FIG. 1B) of the plate-like portion 23, however, the projection height h1 of the first convex portion 24 may be set at a value larger than the plate thickness t of the plate-like portion 23.

The plate-like portion 23 has a first concave portion 26 formed behind the first convex portion 24 to be in a circular concave shape, the first concave portion 26 having a depth dp1 from the other surface 23d of the plate-like portion 23 smaller than the projection height h1 of the first convex portion 24 from the one surface 23c of the plate-like portion 23. The first concave portion 26 is arranged behind the first convex portion 24 in a concentric relationship with the first convex portion 24. The first convex portion 24 and the first concave portion 26 of the element 12A constitute as a whole the concave-convex engagement portion 22 held in concave-convex engagement with the pair of other elements 12P, 12F neighboring the element 12A.

Here, the outer diameter d1 at the end of the first convex portion 24 and the inner diameter d2 of the first concave portion 26 are shown as being remarkably different from each other to enlarge an annular gap of the concave-convex engagement portion between the first convex portion 24 and the first concave portion 26 for better understanding of the present embodiment (see FIGS. 1B and 3A). However, the concave-convex engagement portion 22 is formed to have the outer diameter d1 of the first convex portion 24 slightly smaller than the inner diameter d2 of the first concave portion 26 so that the element 12A and the pair of other elements 12P, 12F neighboring the element 12A can be held in alignment with one another along the center axes of the first convex portion 24 and the first concave portion 26. Naturally, in the case that the elements 12 are designed to be held in alignment with one another by another concave-convex engagement portion other than the previously mentioned concave-convex engagement portion 22, the first convex portion 24 and the first concave portion 26 may be formed and arranged with a sufficient gap as shown in FIGS. 1B and 3A. Although the first concave portion 26 is shown as being in a stepped concave shape, the cross-sectional shape of the first concave portion 26 is not particularly limited as such, as long as the above mentioned projection height h1 of the first convex portion 24 and the function of the above mentioned concave-convex engagement portion 22 of the present embodiment can be ensured.

As shown in FIG. 1A, each of the elements 12 has a head portion 13 in a roughly triangle shape having the first convex portion 24, a body portion 14 having the both side end surface portions 23a, 23b and the second convex portion 25, and a neck portion 15 connecting the head portion 13 and the body portion 14 at their central portions in the belt width direction between the endless band-like rings 11A, 11B. Here, the head portion 13 is arranged outwardly of the endless band-like rings 11A, 11B, while the body portion 14 is arranged inwardly of the endless band-like rings 11A, 11B. The neck portion 15 is narrow in width (lateral width) in the belt width direction as compared with the head portion 13 and the body portion 14, and is slightly longer in length than the thickness of the endless band-like rings 11A, 11B. The body portion 14 is wider in width than the overall width of the band-like rings 11A, 11B having the neck portion 15 disposed therebetween. The band-like rings 11A, 11B are arranged between the head portion 13 and the body portion 14 set with a small clearance predetermined.

At least one of the first convex portion 24 and the second convex portion 25, for example, the second convex portion 25 is formed in a rib shape (protrusion) extending in the belt width direction, i.e., the left and right direction in FIG. 1A.

As shown in FIG. 1B, the second convex portion 25 is formed with a leading end surface (front surface) projecting in the projection direction thereof and is curved in a roughly arc shape. The leading end surface may be curved or bent in a shape close to a polygonal shape such as a trapezoidal shape and a triangle shape according to the present invention. The projection height h2 of the second convex portion 25 from the one surface 23c of the plate-like portion 23 is designed to be set at a value smaller than the difference g1 between the projection height h1 of the first convex portion 24 from the one surface 23c of the plate-like portion 23 and the depth dp1 of the first concave portion 26 from the other surface 23d of the plate-like portion 23 (h2≤h1−dp1=g1), but approximate to the difference g1. This means that each of the elements 12 is adapted to transmit a pressing force to the other neighboring elements in a power transmission direction by at least one of the first convex portion 24 and the second convex portion 25 and mostly by both of the first convex portion 24 and the second convex portion 25 when the elements 12 are advancing straight while being held in parallel with the neighboring elements (see FIGS. 1B and 3A). The projection heights h1, h2 of the first convex portion 24 and the second convex portion 25, respectively, and the widths TH1, TH2 from the rear surfaces B1, B2 of the first convex portion 24 and the second convex portion 25, respectively, are set so that the pressing force in the power transmission direction is assumed by the first convex portion 24 and the second convex portion 25 and the neighboring elements 12 are maintained in parallel relationship with one another when advancing straight. Here, the rear surfaces B1, B2 of the first convex portion 24 and the second convex portion 25 are intended to indicate respective surfaces on which the arbitrary element 12A is subjected to the pressing forces of the first convex portion 24 and the second convex portion 25 of the other element 12F neighboring the rear surface of the arbitrary element 12A.

Further, the plate-like portion 23 has a second concave portion 27 corresponding to the second convex portion 25 formed behind the second concave portion 25. The second concave portion 27 has an opening width w2 in the up and down direction in FIG. 1A, which is the direction of the first convex portion 24 being spaced apart from the second convex portion 25, the opening width w2 of the second concave portion 27 in the up and down direction in FIG. 1A being smaller than the width w1 of the leading end portion of the second convex portion 25 in the same direction. The second convex portion 25 is in a rib shape extending in the belt width direction, and the second concave portion 27 is in a groove shape extending in the belt width direction. While the second concave portion 27 is shown in FIG. 1A as being in a roughly trapezoidal groove shape in cross-section extending longitudinally, the cross-sectional shape of the second concave portion 27 is not necessarily limited as such, if the required projection height h2 of the second convex portion 25 can be ensured. Of course, the length of the second concave portion 27 in a groove shape in left and right direction in FIG. 1A may be shorter than the length of the second convex portion 25 in the rib shape.

The rocking edge portion 21 of each of the elements 12 is constituted by the leading end portion of the second convex portion 25 and extending straight in the belt width direction of the power transmission belt 10 on the one surface 23c side of the plate-like portion 23. The rocking edge portion 21 is adapted to serve as a rocking fulcrum point when each of the elements 12 enters the curved section in which the power transmission belt 10 is wound around the primary pulley 2 or the secondary pulley 3.

More specifically, as shown in FIG. 3B, when the arbitrary element 12A enters the curved section in which the power transmission belt 10 is wound around the driven side secondary pulley 3, the preceding element 12P in the belt rotation direction among the pair of other elements 12P, 12F neighboring the front and rear surface sides of the arbitrary element 12A is rocked with respect to the arbitrary element 12A while the element 12P is being clamped by the secondary pulley 3 and the following element 12F is advancing straight. At this time, the element 12A is pressed on the back side of the element 12A by the following element 12F, and the rocking edge portion 21 of the element 12A engages with the rear surface of the preceding element 12P while the both side end surface portions 23a, 23b of the element 12A are clamped by the secondary pulley 3. The element 12A is pressed in the direction to drive the secondary pulley 3 so that the inner end portions 12i of the element 12A and the pair of other elements 12P, 12F neighboring the element 12A are pressed by the first convex portion 24 of the following element 12F so as to be gradually closer to one another until the rocking edge portion 21 of the element 12A is brought into pressing contact with the rear surface of the preceding element 12P, and by the first convex portion 24 and the rocking edge portion 21 (second convex portion 25) of the following element 12F when the rocking edge portion 21 of the element 12A is brought into pressing contact with the rear surface of the leading element 12P. Therefore, when the element 12A enters the curved section in which the power transmission belt 10 is wound around the secondary pulley 3, the pressing force is imparted in the direction to drive the secondary pulley 3 from the following element 12F advancing straight to the preceding element 12P and the element 12A following the preceding element 12P with their both side end surface portions 23a, 23b being clamped by the secondary pulley 3.

The projection height h2 of the second convex portion 25 corresponding to the height of the rocking edge portion 21 from the one surface 23c of the plate-like portion 23 is set such that, when the power transmission belt 10 is wound around the primary pulley 2 or the secondary pulley 3 at a minimum winding radius (see FIG. 2B), the inner end portions 12*i* of the element 12A and the pair of other elements 12P, 12F neighboring the front and rear surface sides of the element 12A can come in contact with one another and, when the power transmission belt 10 is wound around the primary pulley 2 or the secondary pulley 3 at a radius larger than the minimum winding radius, the inner end portions 12*i* of the element 12A and the pair of other elements 12P, 12F neighboring the front and rear surface sides of the element 12A are spaced apart from one another. In other words, the rocking angle of the element 12A is regulated by the pair of other elements 12P, 12F neighboring the front and rear surface sides of the element 12A within a predetermined angle range and thus prevented from being rocked excessively beyond the predetermined angle range when the element 12A enters the curved section of the power transmission belt 10.

Each of the elements 12 is pressed by fine blanking or the like with the entire area of a frontal profile shape portion shown in FIG. 1A as a front punching surface, and has a shear surface ratio of close to complete shear in the entire area of the profile shape portion. Further, as shown in FIG. 3B, the height of the rocking edge portion 21, i.e., the leading end portion of the second convex portion 25, the position thereof in the up and down direction in FIG. 1A (a distance spaced from the lower surface 13*a* of the head portion 13 or the upper surface 14*a* of the body portion 14, or a distance spaced from the center of the lower surface 13*a* and the upper surface 14*a*) and the curved cross-sectional shape of the leading end surface of the second convex portion 25 are set such that a gap g2 between the neighboring elements 12 of each pair of elements 12 in the vicinity of the inner circumferential surfaces of the endless band-like rings 11A, 11B in the curved section where the power transmission belt 10 is wound around the secondary pulley 3 or the primary pulley 2 is approximately equal to the gap g1 (see FIG. 3A) between each pair of elements 12 in the rectilinear section of the power transmission belt 10.

Next, the method of producing the power transmission belt 10 according to the present embodiment will be described hereinafter.

FIGS. 4A to 4D and FIGS. 5A and 5B are diagrams for explaining the steps constituting an exemplary embodiment of the method of producing the power transmission belt according to the present invention.

When the rocking edge portion 21 rockably engageable with the element 12P among the pair of other elements 12P, 12F neighboring the both surface sides of each of the elements 12, and the concave-convex engagement portion 22 engageable with the pair of other elements 12P, 12F neighboring the both surface sides of each of the elements 12 are formed in precise shapes, respectively, a plate-like material 20 having a predetermined thickness made of a tool steel plate and the like, and a press working step capable of a precise composite shaping such as for example a fine blanking and the like is then carried out.

The plate-like material 20 is constituted by a band-like tool steel having a width approximately double the length in the height direction (up and down direction in FIG. 1A) of the element 12.

Figure 4A:
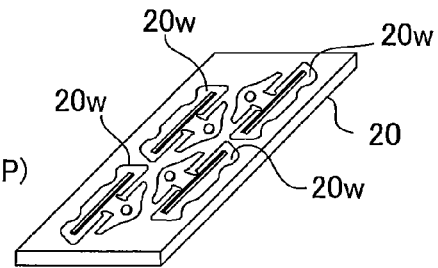
FIG. 4A is an explanation view of the elements in a press working step constituting part of a method of producing the power transmission belt according to the first embodiment of the present invention.

In the press working step, firstly, as shown in FIG. 4A, within a plate-like portion setting area 20*w* where the element 12 is punched out from the plate-like material 20, the concave-convex engagement portion 22 having the first convex portion 24 and the first concave portion 26, the second convex portion 25, and the second concave portion 27 are formed by a projection die having a profile corresponding to the first convex portion 24, the first concave portion 26, the second convex portion 25, and the second concave portion 27. Here, the projection forming by the projection die may be carried out before the profile shape portions of the pair of elements 12 are punched out from the plate-like material 20, or may be carried out between the start and finish of punching the pair of elements 12.

Although not specifically shown in the drawings, the projection forming here forms the first convex portion 24 of a roughly cylindrical shape perpendicularly projecting from the one surface 23*c* of the plate-like portion 23 of the element 12 on one side of the material 20 and the first concave portion 26 in a roughly circular stepped shape perpendicularly recessed from the other surface 23*d* of the plate-like portion 23 of the element 12 at the same time, for example, by using a punch and a counter punch under the condition in which a part of the material 20 is pressed therebetween and protruding projection pins from the punch towards the counter punch. This means that using the projection pin in a shape corresponding to the leading end of the first concave portion 26 and the die having a recessed portion corresponding to the first convex portion 24, a part of each plate-like portion setting area 20*w* of the material 20 is plastically deformed to form the first convex portion 24 on the front surface side in the plate-like portion setting area 20*w* and the first concave portion 26 on the rear surface side thereof. At the same time, using the projection pin or the punch in a shape corresponding to the leading end of the second concave portion 27 and the die having a recessed portion corresponding to the second convex portion 25, a part of each plate-like portion setting area 20*w* of the material 20 is plastically deformed to form the second convex portion 25 on the front surface side in the plate-like portion setting area 20*w* and the second concave portion 27 on the rear surface side thereof.

In the previously mentioned press working step, the first concave portion 26 corresponding to the first convex portion 24 is formed behind the first convex portion 24, while the second concave portion 27 corresponding to the second convex portion 25 is formed behind the second convex portion 25. By this forming, the projection height h1 of the first convex portion 24 from the one surface 23*c* of the plate-like portion 23 becomes larger than the depth dp1 from the other surface 23*d* of the plate-like portion 23 (depth of the rear surface B1). Further, the depth dp2 from the other surface 23*d* of the plate-like portion 23 becomes larger than the projection height h2 of the second convex portion 25 from the one surface 23*c* of the plate-like portion 23, and the opening width w2 of the second concave portion 27 in the up and down direction in FIG. 1B in which the first convex portion 24 is spaced apart from the second convex portion 25 becomes smaller than at least the width w1 of the leading end portion of the second convex portion 25 in the direction the same as the above up and down direction. At this time, the thicknesses TH1, TH2 from the rear surfaces B1, B2 of the first convex portion 24 and the second convex portion 25 are determined, respectively. Ejector pins in opposing relationship with the projection pins may be provided to enhance the releasability when releasing the element 12 from the die plate after punching.

In the press working step previously mentioned, in order to work on a plurality of workpieces W, for example, two workpieces W at the same time, at least one set of punch and counter punch having shapes corresponding to the respective profile shape portions of the plurality of elements 12 and movable projection pins corresponding to projection forming of the first convex portions 24 and the second convex portions 25 can be used. In order to punch out the profile shape portions of the elements 12 in an approximate complete shear, the punch and the counterpunch can be moved while a plurality of plate-like portion setting areas 20*w* of the material 20 are pressed between the punch and the counterpunch under the condition that the remaining portion (portions other than the plate-like portion setting areas 20w) of the material 20 is clamped and held by the die plate and a stinger plate to punch out the workpieces W. The counter punch is formed with respective recessed portions to form the first convex portion 24 and the second convex portion 25 (rocking edge portion 21) of the element 12 into the required shapes.

When the concave-convex engagement portions 22 having the first convex portions 24 and the first concave portions 26, the second convex portions 25, and the second concave portions 27 are projection formed in the plate-like portion setting areas 20w of the plate-like material 20, the punching of the profile shape portions in the plate-like portion setting areas 20w from the plate-like material 20 is then carried out, whereby the workpieces W which eventually become the plurality of elements 12 are produced in sequence.

The punching and the projection forming of the workpiece W can be carried out in parallel. However, the timing of the completion of punching out the workpiece W is after the completion of projection forming of the first convex portion 24 and the second convex portion 25 on the workpiece W. This means that it is preferable that the first convex portion 24 and the second convex portion 25 be formed within the plate-like portion setting area 20w in which the plate-like portion 23 of the element 12 is punched out from the plate-like material 20 before completing the punching of the plate-like portion 23 of the element 12 from the plate-like material 20.

Figure 4B:
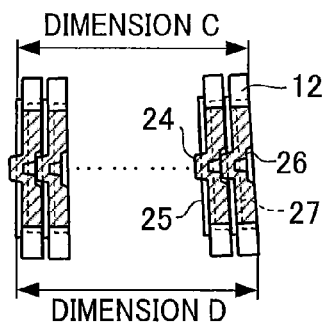
FIG. 4B is an explanation view of the elements in a stacking step constituting part of the method of producing the power transmission belt according to the first embodiment of the present invention.
Figure 5A:
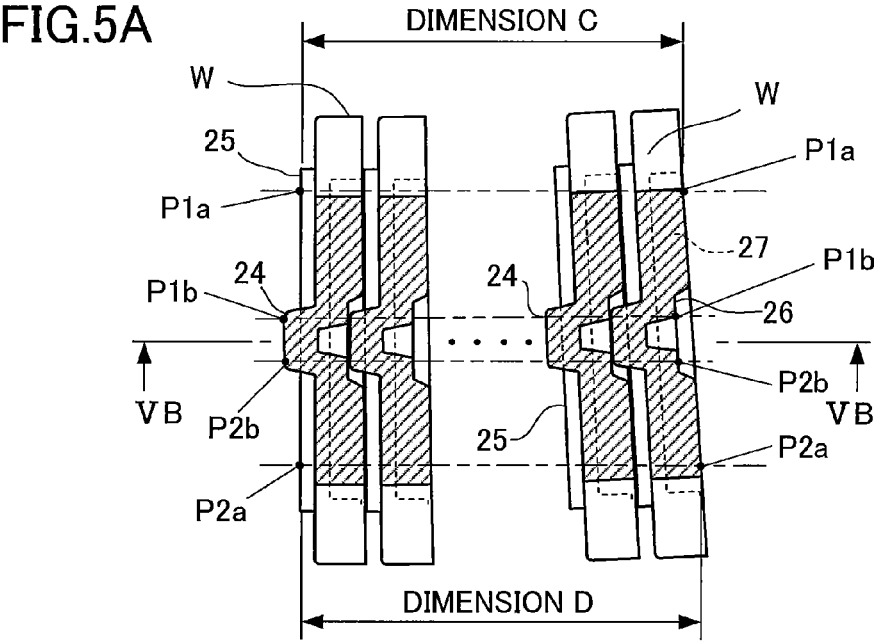
FIG. 5A is a plane cross-sectional view of the central positions of first convex portions of the stacked elements forming part of the power transmission belt according to the first embodiment of the present invention and showing application points of a compression load in the width direction of the power transmission belt and dimension measuring positions.
Figure 5B:
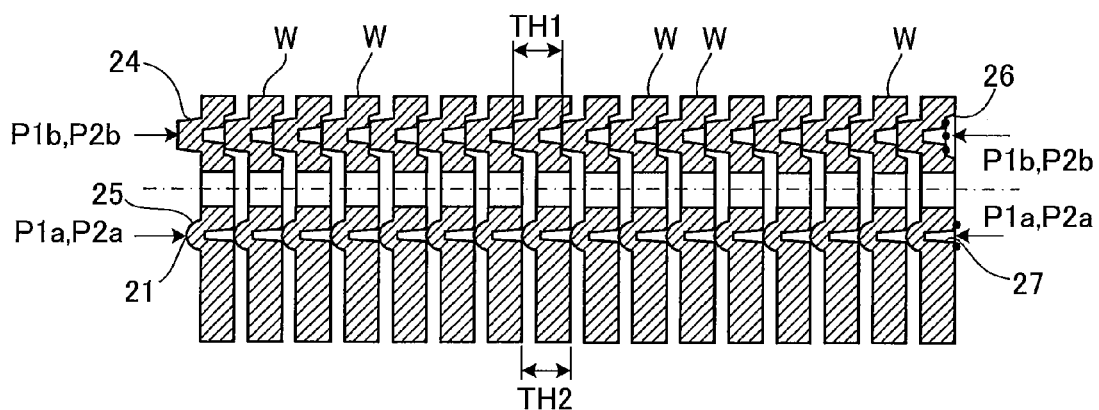
FIG. 5B is a cross-sectional side view of the central positions of the first convex portions of the stacked elements forming part of the power transmission belt according to the first embodiment of the present invention and showing application points of a compression load in the thickness direction of the power transmission belt and dimension measuring positions.

Now, the total number of elements 12 required for one power transmission belt 10 is defined as a first stacking number (for example 400 pieces) and, by equally dividing the first stacking number into a plurality of groups, the number of elements 12 required for one divided group is defined as a second stacking number. As shown in FIGS. 4B, 5A, and 5B, a stacking step is carried out to align and stack the workpieces W formed with the first convex portion 24 and the second convex portion 25 on the plate-like portion 23 in the press forming step. Then, a dimension C and a dimension D shown in FIGS. 4B, 5A, and 5B which represent the respective thicknesses of the stacked workpieces W on both sides in the belt width direction are measured. In FIG. 5A, the difference in the thickness of the workpieces W on both sides in the belt width direction is shown exaggerated and only the workpieces W occupying the both ends of the stacked workpieces W out of the multiple pieces of the workpieces W are shown.

In the stacking step, depending on the setting values of the projection heights h1 and h2 of the first convex portion 24 and the second convex portion 25 from the one surface 23c of the plate-like portion 23, respectively, and the depth dp1 of the first concave portion 26, the multiple elements 12 stacked in the first stacking number or the second stacking number may be gently curved as a whole while they are roughly straight lined. Accordingly, the direction of measurement may be differentiated depending on the multiple elements 12 stacked in the first stacking number or the second stacking number being in straight line or being curved.

For example, when a stacked body (stacked elements) of the workpieces W stacked in the first stacking number or the second stacking number is straight lined, the dimension C and the dimension D are measured under a first stacking condition in which under the load condition approximately the same as when the elements 12 are in pressing contact with one another in the driving direction at the rectilinear section of the power transmission belt 10 and, for each of the stacked workpieces W, the first convex portion 24 and the rear surface B1 thereof are pressed against the facing rear surface B1 in the first concave portion 26 and the first convex portion 24 of the other neighboring workpieces W, respectively, and the second convex portion 25 and the rear surface B2 thereof (vicinity of edge portion of the opening of the second concave portion 27 on both sides in the up and down direction and/or the left and right direction) are pressed against the facing rear surface B2 and the second convex portion 25 of the other neighboring workpieces W, respectively. In this case, the measuring positions of the dimension C and the dimension D are, for example, the positions at both end portions of the head portion 13 of the stacked elements 12 and being equally apart from the center of the head portion 13 in the belt width direction, or the positions in the vicinity of both end portions of the rocking edge portion 21, i.e., the leading end portion of the second convex portion 25, and being equally apart from the center of the rocking edge portion 21 in the belt width direction. When measuring the dimension C and the dimension D, the measurement may be made while the both side end surface portions 23a, 23b of the plate-like portions 23 formed on the neighboring workpieces W are guided by an aligning guide surface having the same angle of inclination as the primary pulley 2 and the secondary pulley 3.

On the other hand, when a stacked body (stacked elements) of the workpieces W stacked in the first stacking number or the second stacking number is not straight lined but curved, the stacked body is straight lined by making a shorter stacked body of the workpieces W stacked in a third stacking number that is the number obtained by further dividing the second stacking number equally. The dimension C and the dimension D are then measured under a second stacking condition in which under the load condition approximately the same as when the elements 12 are in pressing contact with one another in the driving direction at the rectilinear section of the power transmission belt 10 and, for each of the stacked workpieces W, the first convex portion 24 and the rear surface B1 thereof are pressed against the facing rear surface B2 in the first concave portion 26 and the first convex portion 24 of the other neighboring workpieces W, respectively, and the second convex portion 25 and the rear surface B2 thereof are pressed against the facing rear surface B2 and the second convex portion 25 of the other neighboring workpieces W, respectively. The measuring positions of the dimension C and the dimension D are the same as those mentioned above.

In this case, the both side end surface portions 23a, 23b of the plate-like portions 23 may be guided by an aligning guide surface having the same angle of inclination as the primary pulley 2 and the secondary pulley 3 and a specific curvature radius. The specific curvature radius here corresponds to the curvature radius of the multiple workpieces W stacked in the third stacking number producing a curvature corresponding to the set values of the projection heights h1, h2 of the first convex portion 24 and the second convex portion 25 from the one surface 23c of the plate-like portion 23, respectively, and the depth dp1 of the first concave portion 26 of each of the workpieces W.

Figure 4C:
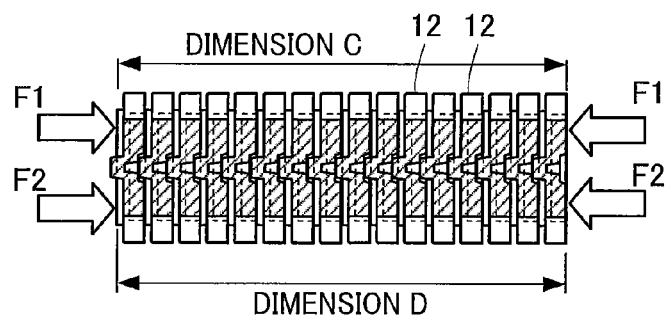
FIG. 4C is an explanation view of the elements in a thickness adjusting step constituting part of the method of producing the power transmission belt according to the first embodiment of the present invention.
Figure 4D:
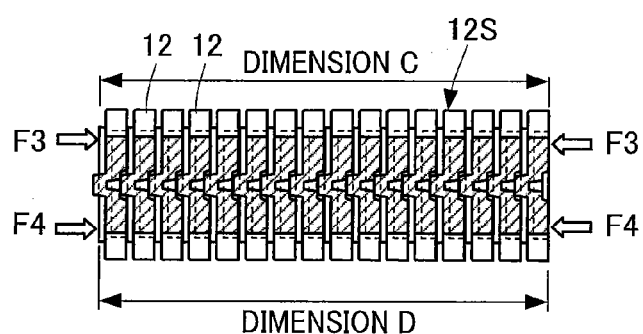
FIG. 4D is an explanation view of the elements in a dimension measuring step following the thickness adjusting step and constituting part of a method of producing the power transmission belt according to the first embodiment of the present invention.

As shown in FIG. 4C, a thickness adjusting step is carried out to adjust the dimension C and the dimension D which are the thicknesses of the workpieces W in the stacked condition to measurements within the setting ranges by applying to the stacked workpieces W compression loads F1, F2 in degrees that a part of at least one of the first convex portion 24 and the second convex portion 25 can be plastically deformed under the first stacking condition or the second stacking condition. In this case, the compression loads F1, F2 are the load sufficiently larger than a maximum compression load acted in the pulley driving direction when the power transmission belt 10 is used after assembled with the continuously variable transmission 1.

The areas of the compression loads F1, F2 to be applied are either the entire area of the first convex portion 24 and the second convex portion 25 in the belt width direction or the pressing areas on left and right (for example, including pressing points P1a, P1b, P2a, and P2b shown in FIGS. 5A and 5B) equally apart in the belt width direction from the center positions of the first convex portion 24 and the second convex portion 25, thereby allowing the dimension C and the dimension D which are the thicknesses of the workpieces W in the stacked condition to be adjusted to the measurements within the setting ranges corresponding to the loads F1, F2 applied on both sides in the belt width direction (difference in both loads and sum of the both loads).

Similarly to the above dimension measurement, on the elements 12 following the thickness adjusting step, under the load condition approximately the same as when the elements 12 are in pressing contact with one another in the driving direction at the rectilinear section of the power transmission belt 10, the dimension C and the dimension D, i.e., the thicknesses of the stacked workpieces W on both sides in the belt width direction of the power transmission belt 10, are then measured. In this case, the elements 12 are applied with compression loads F3, F4 sufficiently smaller than the compression loads F1, F2. The areas of the compression loads F3, F4 applied are the same as those with the compression loads F1, F2. More specifically, the areas of the compression loads F3, F4 to be applied to the stacked elements 12 are either the entire area of the first convex portion 24 and the second convex portion 25 in the belt width direction or the areas including the pressing points of P1a, P1b, P2a, and P2b equally apart in the belt width direction on left and right from the center positions of the first convex portion 24 and the second convex portion 25.

Meanwhile, the endless band-like rings 11A, 11B are each produced as stacked metal rings in which a plurality of ribbon-shaped members made of metal material are stacked.

The elements 12 that are punched from the plate-like material 20 in the press working step and that the thickness adjusting step is carried out thereto are then stacked in the thickness direction thereof along the endless band-like rings 11A, 11B. In this case, the endless band-like rings 11A, 11B are placed on both sides of the neck portion 15 and between the head portion 13 and the body portion 14 of each of the elements 12, and each of the elements 12 is rockably and slidably assembled with the endless band-like rings 11A, 11B. When a predetermined number of elements 12 are assembled with the endless band-like rings 11A, 11B, the predetermined number of elements 12 become annularly bonded by the endless band-like rings 11A, 11B, completing the power transmission belt 10.

The operation will be explained hereinafter.

In the power transmission belt and the method of producing the same according to the present embodiment in the foregoing, when the transmission of power (power transmission) is performed between the primary pulley 2 and the secondary pulley 3 via the power transmission belt 10, the first convex portion 24 and the second convex portion 25 are engaged to press against one another at the rectilinear section in which the elements 12 are in pressing contact in parallel relationship with one another, and the second convex portion 25, i.e., the rocking edge portion 21, and the rear surface B2 are engaged to press against each other in the curved section in which the power transmission belt 10 is wound around the secondary pulley 3 or the primary pulley 2. Consequently, even if the variation in the thickness of the plate-like portion 23 of the element 12 is likely to occur, the fact that the first convex portion 24 and the second convex portion 25 are formed into the required heights h1, h2 and the required thicknesses TH1, TH2 from the rear surfaces B1, B2, respectively, by precision press forming allows the differences in the thickness of the thicknesses TH1, TH2 on both sides of the first convex portion 24, which becomes the thickness of the element 12, and the second convex portion 25, respectively, in the belt width direction and the variations among the elements 12 to be sufficiently reduced. Further, the fact that it is not necessary to make the plate thickness t of the plate-like portion 23 as thick as the height of the rocking edge portion 21 allows the power transmission belt 10 to be lightweight easily. Furthermore, when the multiple elements 12 are stacked, the neighboring elements 12 are engaged to press against one another by the first convex portion 24, the leading end of the second convex portion 25, and their respective rear surfaces B1, B2. This makes it possible, by appropriately setting the projection heights h1, h2 of the first convex portion 24 and the second convex portion 25, respectively, to produce the multiple kinds of elements 12 different in thickness from the material 20 of the same plate thickness t.

In the present embodiment, the projection height h1 of the first convex portion 24 from the one surface 23c of the plate-like portion 23 is larger than the projection height h2 of the second convex portion 25 from the one surface 23c of the plate-like portion 23. This allows the first convex portion 24 to be used serving as the convex portion of the concave-convex engagement portion 22, and allows the first convex portion 24 to support the pressing force between the elements 12 in the section in which the elements 12 are in pressing contact in parallel relationship with one another.

The plate-like portion 23 has the first concave portion 26 formed behind the first convex portion 24 such that the depth dp1 from the other surface 23d of the plate-like portion 23 is smaller than the projection height h1 of the first convex portion 24 from the one surface 23c of the plate-like portion 23, and the concave-convex engagement portion 22 is constructed by the first convex portion 24 and the first concave portion 26. This allows the first convex portion 24, which primary supports the pressing force in the section where the elements 12 are in pressing contact in parallel relationship with one another, to be used as the convex portion of the concave-convex engagement portion 22 that has a function to align the elements 12, thereby stabilizing the operating point of the pressing force resulting in a stable power transmission.

In addition, in the present embodiment, each of the elements 12 has the head portion 13 having the first convex portion 24, the body portion 14 having the second convex portion 25, and the neck portion 15 connecting the head portion 13 with the body portion 14, and the second convex portion that is at least one of the first convex portion 24 and the second convex portion 25 is in a rib shape extending in the belt width direction. Accordingly, the inclination of each of the elements 12 where the elements 12 come close to one another on one end and separate from one another on the other end in the belt width direction can be effectively suppressed.

The plate-like portion 23 has the second concave portion 27 corresponding to the second convex portion 25 behind the second convex portion 25, and the opening width w2 of the second concave portion 27 in the direction of the first convex portion 24 being spaced apart from the second convex portion 25 is smaller than at least the width w1 of the leading end portion of the second convex portion 25 in the same direction. Consequently, even when the plate thickness t of the plate-like portion 23 is small, forming the second concave portion 27 ensures the required projection height h2 of the second convex portion 25, and thus the second convex portion 25 can be engaged to press against the other neighboring elements 12 in the vicinity of the second concave portion 27.

The second convex portion 25 which is reduced in difference and variation in height h2 on both sides in the belt width direction is in a rib shape extending in the belt width direction, and the leading end portion thereof constitutes the rocking edge portion 21. This makes it possible for the elements 12 to stably rock when the power transmission belt 10 is wound around the primary pulley 2 or the secondary pulley 3, to stably maintain their balance, and to stably transmit the pressing force when advancing straight, whereby the durability of the power transmission belt 10 and the continuously variable transmission 1 can be prevented from being deteriorated by the edge contact and such between the elements 12 and the primary pulley 2 or the secondary pulley 3.

Meanwhile, in the method of producing the power transmission belt of the present embodiment, included is the press forming step in which the plate-like portion 23 having the both side end surface portions 23a, 23b is punched out from the plate-like material 20 for the elements 12, and the first convex portion 24 projecting from the one surface 23c of the plate-like portion 23 towards either one of the pair of other elements 12 and the second convex portion 25 constituting the rocking edge portion 21 in spaced relationship with the first convex portion 24 and projecting from the one surface 23c of the plate-like portion 23 are formed. This makes it possible to produce the elements 12 of different thicknesses from the material 20 of the same thickness by appropriately setting the projection heights of the first convex portion 24 and the second convex portion 25.

Furthermore, the compression loads F1, F2 that are sufficiently larger than the pressing load between the elements 12 after assembled but relatively small in a degree that the projection heights h1, h2 of the first convex portion 24 and the second convex portion 25 can be adjusted are applied to the multiple workpieces W stacked after punching. This reduces the difference in the thickness of the thicknesses TH1, TH2, respectively, on both sides of the elements 12 in the belt width direction and allows the thicknesses TH1, TH2 of the elements 12 to be uniform.

The method of producing the power transmission belt of the present embodiment includes the thickness adjusting step in which a plurality of workpieces W formed with the first convex portion 24 and the second convex portion 25 on the plate-like portion 23 in the press forming step is stacked and, by applying the compression loads F1, F2 capable of partly plastically deforming at least one of the first convex portions 24 and the second convex portions 25 of the stacked workpieces W, the dimension C and the dimension D that are the thicknesses of the multiple workpieces W in the stacked condition are adjusted to be within the respective setting ranges. This makes it less likely to occur that the stacked elements 12S (see FIG. 4D) which include a substantial number of good elements 12 if they are inspected individually are determined defective or that the stacked elements 12S determined good are mixed with the elements 12 defective in thickness, thereby allowing the incidence ratio of defective elements 12 to be reduced, and thus lowering the production cost of the power transmission belt 10. Accordingly, in terms of this, it can effectively prevent the durability of the power transmission belt 10 and the continuously variable transmission 1 assembled therewith from being deteriorated by the edge contact and such between the elements 12 and the primary pulley 2 or the secondary pulley 3.

In the thickness adjusting step, the dimension C and the dimension D that are the thicknesses of the multiple workpieces W in a stacked condition on both sides thereof in the belt width direction are measured and the compression loads F1, F2 are applied to the multiple workpieces W so that the difference between the both dimensions comes to within a predetermined allowable range. This further ensures that the difference between the thicknesses TH1, TH2 of the multiple elements 12 on both sides in the belt width direction is reduced.

Further, in the press forming step, the second concave portion 27 having the opening width w2 smaller in the direction in which the first convex portion 24 is spaced apart from the second convex portion 25 than at least the width w1 of the second convex portion 25 in the same direction is formed behind the second convex portion 25. This makes it possible to define the edge portion of the opening and the rear surface B2 of the concave portion 27 into the required shapes and positions at the same time as the second concave portion 27, thereby appropriately setting the rocking fulcrum point of the element 12.

In the press forming step, before completing the punching of the plate-like portion 23 from the plate-like material 20 for the element 12, the first convex portion 24 and the second convex portion 25 are formed within the plate-like portion setting area 20w where the plate-like portion 23 is punched out from the plate-like material 20. This makes it possible to form the first convex portion 24 and the second convex portion 25 easily and highly precisely.

(Second Embodiment)

Figure 6A:
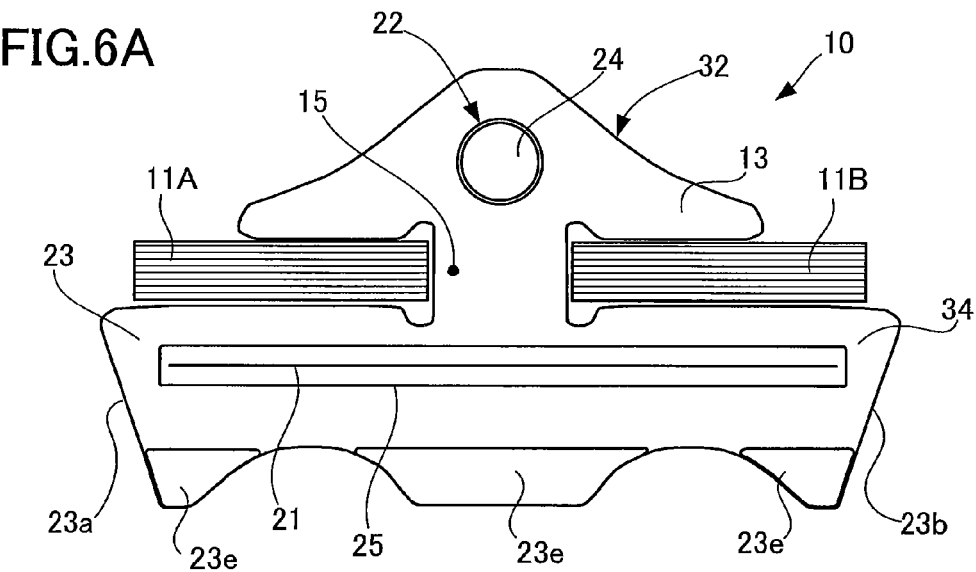
FIG. 6A is a front view of an element forming part of a power transmission belt according to the second embodiment of the present invention.
Figure 6B:
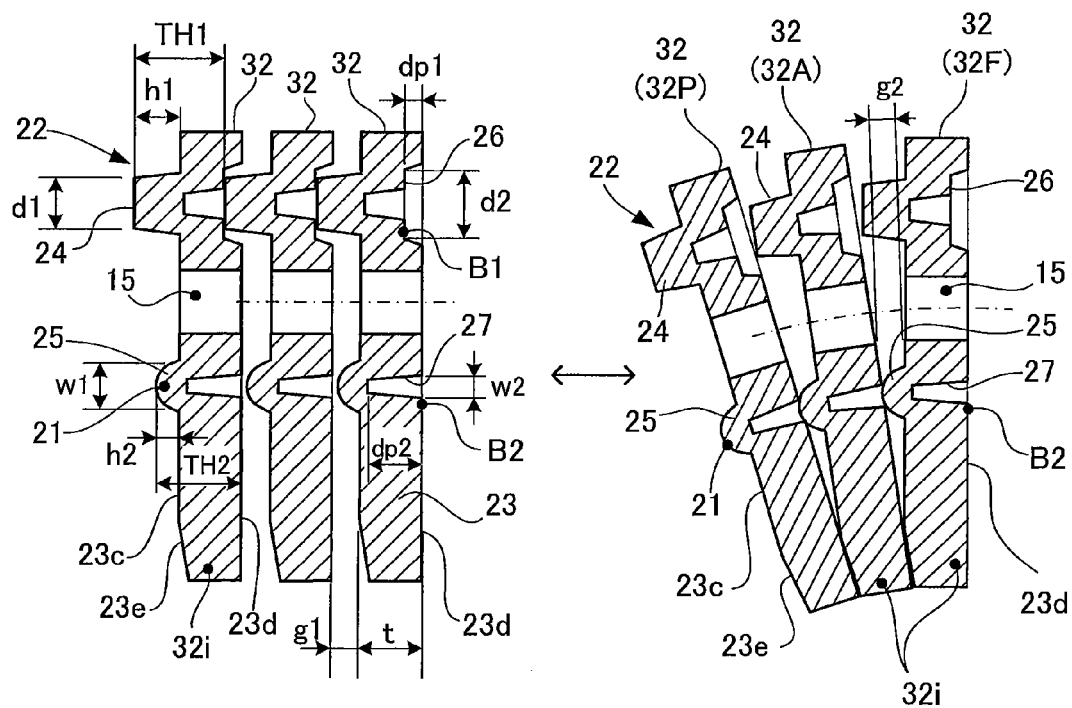
FIG. 6B is a side cross-sectional view of the neighboring elements of the power transmission belt according to the second embodiment of the present invention and showing changes in the state of the neighboring elements at the rectilinear section and at the curved section of the power transmission belt.

FIGS. 6A and 6B illustrate a power transmission belt according to a second embodiment of the present invention. The exemplary embodiments described hereinafter include the construction the same as or similar to the first embodiment described in the foregoing. Therefore, the same reference symbols are used for such portions of the construction corresponding to those constituent elements of the first embodiment, and the difference to the first embodiment will be described in detail.

The power transmission belt 10 of the present embodiment is constructed by assembling elements 32 illustrated in FIGS. 6A and 6B with the endless band-like rings 11A, 11B. Each of the elements 32, similarly to the element 12 of the first embodiment, has the plate-like portion 23 having the both side end surface portions 23a, 23b, the first convex portion 24 projecting from the one surface 23c of the plate-like portion 23 towards either one of a pair of other elements 32P, 32F neighboring the front and rear surfaces 23c, 23d of the plate-like portion 23, and the second convex portion 25 projecting from the one surface 23c of the plate-like portion 23 in a spaced relationship with the first convex portion 24 to constitute the rocking edge portion 21.

Each of the elements 32 has the head portion 13 in a roughly triangular shape having the first convex portion 24, a body portion 34 having the both side end surface portions 23a, 23b and the second convex portion 25 and formed with an inclined surface 23e, and the neck portion 15 connecting the head portion 13 and the body portion 34 at their central portions in the belt width direction between the endless band-like rings 11A, 11B. The body portion 34 is wider in width than the overall width of the endless band-like rings 11A, 11B having the neck portion 15 disposed therebetween, and the endless band-like rings 11A, 11B are arranged between the body portion 34 and the head portion 13 set with a predetermined small clearance.

As depicted in FIG. 6B, the rocking edge portion 21 of each element 32 is adapted to serve as a rocking fulcrum point when the element 32 enters the curved section where the power transmission belt 10 is wound around the primary pulley 2 or the secondary pulley 3 and rocks.

More specifically, when the arbitrary element 32A enters the curved section where the power transmission belt 10 is wound around, for example, the driven side secondary pulley 3, the preceding element 32P in the belt rotation direction among the pair of other elements 32P, 32F neighboring the front and rear surface sides of the arbitrary element 32A rocks with respect to the arbitrary element 32A while the element 32P is being clamped by the secondary pulley 3 and the following element 32F is advancing straight. At this time, the element 32A is pressed on the back side of the element 32A by the following element 32F, and the rocking edge portion 21 of the element 32A engages with the rear surface of the preceding element 32P while the both side end surface portions 23a, 23b of the element 32A are clamped by the secondary pulley 3. The element 32A is pressed in the direction to drive the secondary pulley 3 by the first convex portion 24 of the following element 32F so that the inner end portions 32i of the element 32A and the pair of other elements 32P, 32F neighboring the element 32A gradually come closer to one another until the rocking edge portion 21 of the element 32A is brought into engagement with the rear surface of the preceding element 32P, and by the first convex portion 24 and the rocking edge portion 21 (second convex portion 25) of the following element 32F when the rocking edge portion 21 of the element 32A is brought into engagement with the rear surface of the leading element 32P. Therefore, when the element 32A enters the curved section where the power transmission belt 10 is wound around the secondary pulley 3, the element 32A is imparted with the pressing force in the direction to drive the secondary pulley 3 from the following straight advancing element 32F while the both side end surface portions 23a, 23b of the element 32A are clamped by the secondary pulley 3.

The projection height h2 of the second convex portion 25 corresponding to the height of the rocking edge portion 21 from the one surface 23c of the plate-like portion 23 is set such that, when the power transmission belt 10 is wound around the primary pulley 2 or the secondary pulley 3 at a minimum winding radius (see FIG. 6B), the inner end portions 32i of the element 32A and the pair of other elements 32P, 32F neighboring on the front and rear sides of the element 32A can be engaged with one another at the inner end portions 32i each having the inclined surface 23e and, when the power transmission belt 10 is wound around the primary pulley 2 or the secondary pulley 3 at a winding radius larger than the minimum winding radius, the inner end portions 32i of the element 32A and the pair of other elements 32P, 32F neighboring on the front and rear sides of the element 32A can be spaced apart from one another.

In other words, in the present embodiment, the inner end portion 32i of the element 32 on the opposite side of the first convex portion 24 with respect to the rocking edge portion 21 is made to serve as an abutting portion that is capable of abutting on the pair of other elements 32P, 32F when each of the elements 32 rocks while it is wound around the secondary pulley 3 or the primary pulley 2. Because of the inclined surface 23e that is one surface of the inner end portion 32i being inclined with a constant inclined angle with respect to the one surface 23c of the plate-like portion 23, the thickness of the element 32 is made smaller towards the inner end portion. This makes it possible to set a maximum inclination angle between each of the neighboring pair of other elements 32 to be large, thereby allowing the elements 32 to be adequately wound even when the winding radius on the pulley is small.

Other constructions are the same as those of the first embodiment described above.

In the present embodiment, even when the variation in the thickness of the plate-like portion 23 of the element 32 is likely to occur, forming the first convex portion 24 and the second convex portion 25 into the required heights h1, h2 makes it possible to sufficiently reduce the difference between the thicknesses TH1, TH2 of the element 32 on both sides in the belt width direction. Further, the fact that it is not necessary to make the plate thickness t of the plate-like portion 23 as thick as the height of the rocking edge portion 21 allows the weight of the power transmission belt 10 to be reduced easily. As a consequence, the element 32 can be produced at low cost, and the power transmission belt that sufficiently ensures the durability of a transmission mechanism such as a belt type continuously variable transmission can be provided.

By appropriately setting the projection heights h1, h2 of the first convex portion 24 and the second convex portion 25, respectively, the elements 32 of different thicknesses can be produced from the material 20 of the same plate thickness t.

Further, applying the compression loads F1, F2 of substantially larger than the pressing load between the elements 32 after assembled but small enough in a degree that the projection heights of the first convex portion 24 and/or the second convex portion 25 can be adjusted to the multiple elements 32 (workpieces W) stacked after punching makes it possible to surely reduce the difference between the thicknesses TH1, TH2 of the elements 32 on both sides in the belt width direction and to achieve the thicknesses TH1, TH2 of the elements 32 to be uniform. Consequently, the method of producing the power transmission belt that allows the lightweight element 32 to be produced at low cost can be realized.

(Third Embodiment)

Figure 7A:
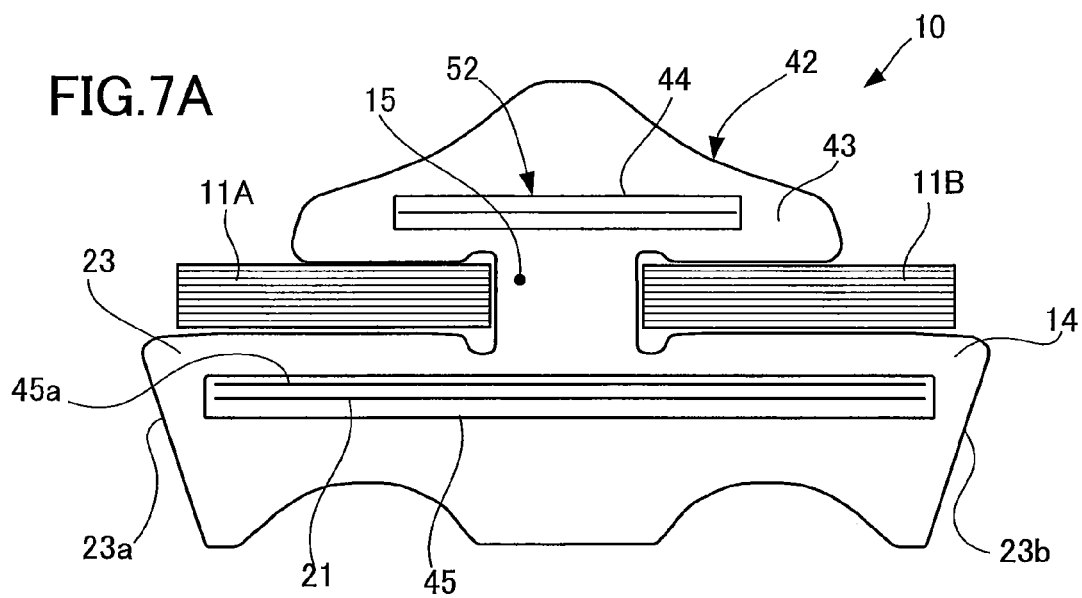
FIG. 7A is a front view of an element forming part of a power transmission belt according to the third embodiment of the present invention.
Figure 7B:
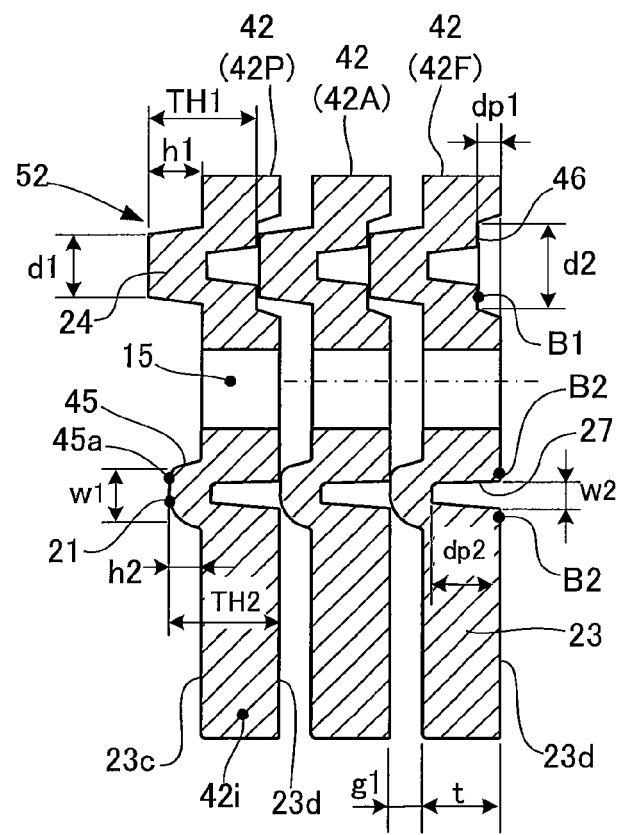
FIG. 7B is a side cross-sectional view of the neighboring elements of the power transmission belt according to the third embodiment of the present invention.

FIGS. 7A and 7B illustrate a power transmission belt according to a third embodiment of the present invention.

The power transmission belt 10 of the present embodiment is constructed by assembling elements 42 illustrated in FIGS. 7A and 7B with the endless band-like rings 11A, 11B. Each of the elements 42 has the plate-like portion 23 having the both side end surface portions 23a, 23b, a first convex portion 44 projecting from the one surface 23c of the plate-like portion 23 towards either one of a pair of other elements 42P, 42F neighboring the front and rear surfaces 23c, 23d of the plate-like portion 23 and extending in parallel with the rocking edge portion 21 in a rib shape, and a second convex portion 45 projecting from the one surface 23c of the plate-like portion 23 in a spaced relationship with the first convex portion 44 to constitute the rocking edge portion 21.

Each of the elements 42 has a head portion 43 in a roughly triangular shape having the first convex portion 44, the body portion 14 having the both side end surface portion 23a, 23b and the second convex portion 45, and the neck portion 15 connecting the head portion 43 and the body portion 15 at their central portions in the belt width direction between the endless band-like rings 11A, 11B. The endless band-like rings 11A, 11B are inserted between the body portion 14 and the head portion 43 set with a small clearance predetermined.

The plate-like portion 23 of each element 42 has a first concave portion 46 formed to be in a groove shape such that the depth dp1 of the first concave portion 46 from the other surface 23d of the plate-like portion 23 is smaller than the projection height h1 of the first convex portion 44 from the one surface 23c of the plate-like portion 23, and the first concave portion 46 is arranged in parallel with and behind the first convex portion 44.

As depicted in FIG. 7B, the first convex portion 44 and the first concave portion 46 of an arbitrary element 42A constitute as a whole a concave-convex engagement portion 52 held in concave-convex engagement with the pair of other elements 42P, 42F neighboring the element 42A.

The second convex portion 45 of each element 42 has a load supporting portion 45a that abuts on the rear surface of the neighboring preceding element 42P arranged towards the head portion 43 side by the rocking edge portion 21, and the load supporting portion 45a is adapted to support the pressing load in the driving direction at the rectilinear section of the power transmission belt 10 together with the first convex portion 44.

The plate-like portion 23 of each element 42 has a second concave portion 47 corresponding to the second convex portion 45 and arranged behind the second convex portion 45. The second concave portion 47 has the opening width w2 in the up and down direction in FIG. 7A in which the first convex portion 44 is spaced apart from the second convex portion 45, and the opening width w2 is arranged to be smaller than at least the width w1 of the leading end portion of the second convex portion 45 in the same direction. Further, the second convex portion 45 is formed in a rib shape extending in the belt width direction, and the second concave portion 47 is formed in a groove shape extending in the belt width direction.

The projection height h2 of the second convex portion 45 corresponding to the height of the rocking edge portion 21 from the one surface 23c of the plate-like portion 23 is set as the same as that of the first embodiment. Accordingly, when the power transmission belt 10 is wound around the primary pulley 2 or the secondary pulley 3 at a minimum winding radius, the inner end portions 42i of the element 42A and the pair of other elements 42P, 42F neighboring on the front and rear surface sides of the element 42A having the inclined surfaces 23e can be engaged with one another and, when the power transmission belt 10 is wound around the primary pulley 2 or the secondary pulley 3 at a winding radius larger than the minimum winding radius, the inner end portions 42i of the element 42A and the pair of other elements 42P, 42F neighboring on the front and rear surface sides of the element 42A are spaced apart from one another.

In the present embodiment, by forming the first convex portion 44 and the second convex portion 45 into the required heights h1, h2 and by forming the thicknesses TH1, TH2 from the rear surfaces B1, B2 of the first convex portion 44 and the second convex portion 45 at the required precision, the functions and effects similar to those of the first embodiment are obtained.

Furthermore, in the present embodiment, not only the second convex portion 45 but also the first convex portion 44 is in a rib shape. This makes it possible to prevent the elements 42 from inclining against one another at the rectilinear section, thereby further stabilizing the rectilinear posture of the elements 42.

(Fourth Embodiment)

Figure 8A:
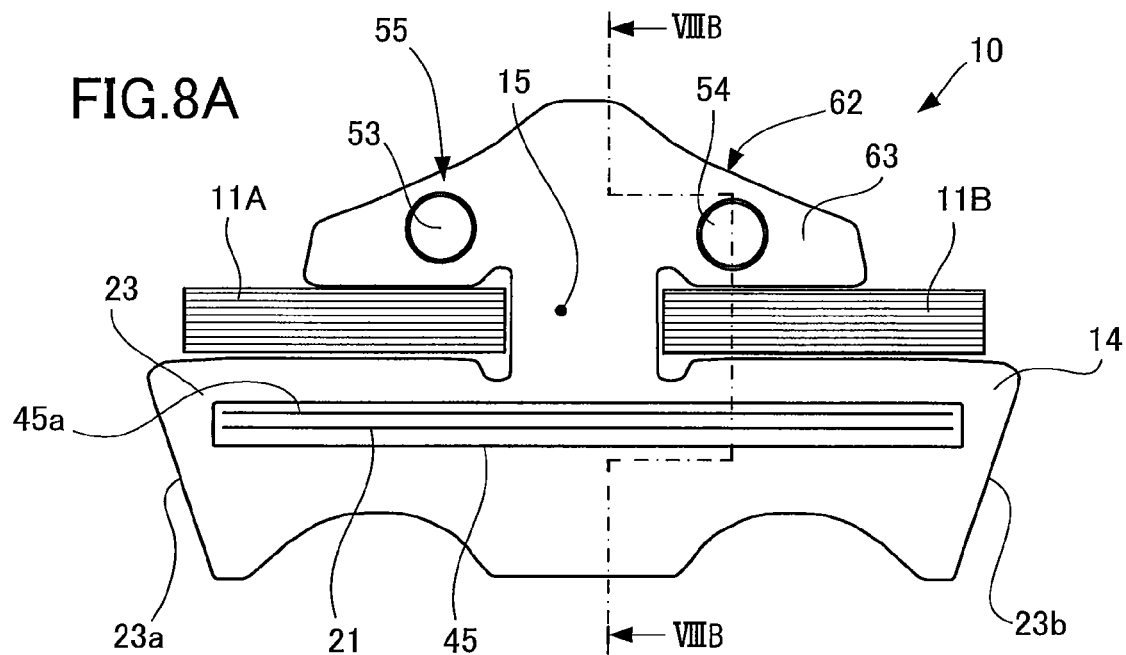
FIG. 8A is a front view of an element forming part of a power transmission belt according to the fourth embodiment of the present invention.
Figure 8B:
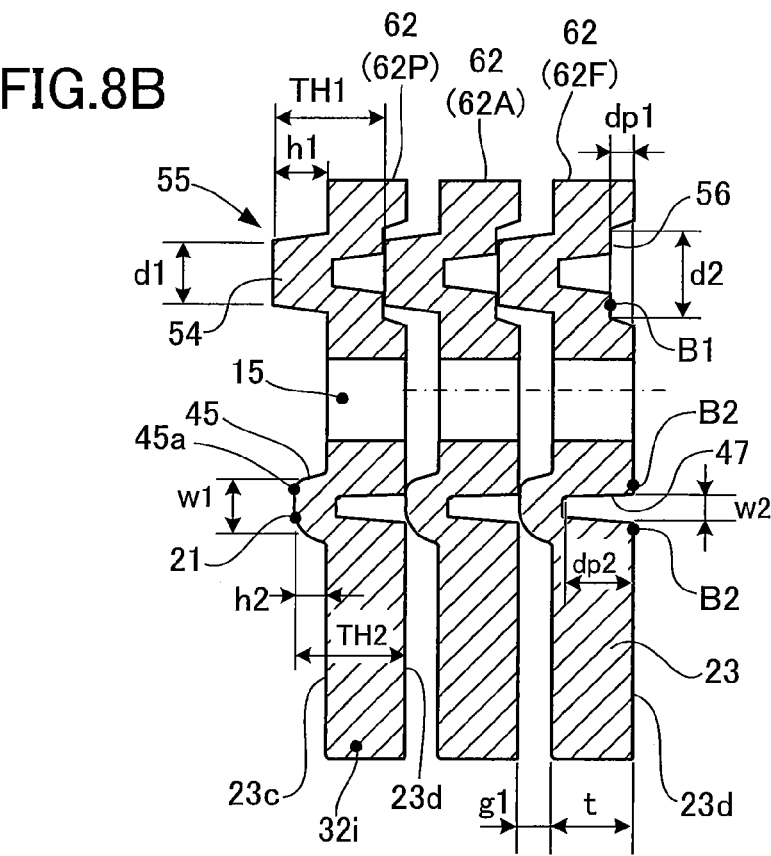
FIG. 8B is a cross-sectional view taken along the line VIIIB-VIIIB of FIG. 8A and seen in the direction shown by arrows from the line VIIIB-VIIIB.

FIGS. 8A and 8B illustrate a power transmission belt according to a fourth embodiment of the present invention.

The power transmission belt 10 of the present embodiment is constructed by assembling a plurality of elements 62 depicted in FIGS. 8A and 8B with the endless band-like rings 11A, 11B. An arbitrary element 62A, i.e., each of the elements 62, has the plate-like portion 23 having the both side end surface portions 23a, 23b, a plurality of first convex portions 53, 54 projecting from the one surface 23c of the plate-like portion 23 towards either one of a pair of other elements 62P, 62F neighboring the front and rear surfaces 23c, 23d of the plate-like portion 23 and in a roughly cylindrical or roughly circular truncated cone shape in a spaced relationship from one another in the belt width direction in parallel with the rocking edge portion 21, and the second convex portion 45 projecting from the one surface 23c of the plate-like portion 23 in a spaced relationship with the first convex portions 53, 54 to constitute the rocking edge portion 21.

In the present embodiment, each of the elements 62 has a head portion 63 having the first convex portions 53, 54, the body portion 14 having the second convex portion 45, and the neck portion 15 connecting the head portion 63 and the body portion 14. The first convex portions 53, 54 that are at least one of the first convex portions 53, 54 and the second convex portion 45 are constructed with a plurality of projections spaced apart from one another in the belt width direction. The endless band-like rings 11A, 11B are inserted between the body portion 14 and the head portion 63 set with a small clearance predetermined.

Further, the plate-like portion 23 of each element 62 has, similarly to the third embodiment, the second concave portion 47 in a groove shape corresponding to the second convex portion 45 behind the second convex portion 45 in a rib shape (protrusion), and the second concave portion 47 has the opening width w2 in the up and down direction in FIG. 8A in which the first convex portions 53, 54 are spaced apart from the second convex portion 45, and the opening width w2 is arranged to be smaller than at least the width w1 of the leading end portion of the second convex portion 45 in the same direction.

The plate-like portion 23 of each element 62 has first concave portions 56 formed to be in a groove shape such that the depth dp1 of each of the first concave portions 56 from the other surface 23d of the plate-like portion 23 is smaller than the projection height h1 of each of the first convex portions 53, 54 from the one surface 23c of the plate-like portion 23, and the first concave portions 56 are arranged in parallel with and behind the first convex portions 53, 54. The first convex portions 53, 54 and the first concave portions 56 constitute as a whole a concave-convex engagement portion 55 held in concave-convex engagement with the pair of other elements 62P, 62F neighboring the element 62A.

Other constructions are the same as those of the first embodiment described above.

In the present embodiment, by forming the first convex portions 53, 54 and the second convex portion 45 into the required heights h1, h2 and by forming the thicknesses TH1, TH2 from the rear surfaces B1, B2 of the first convex portions 53, 54 and the second convex portion 45 at the required precision, the functions and effects similar to those of the first embodiment can be expected. In addition, because the first convex portions 53, 54 are in multiple projections of the same height h1 spaced apart from one another in the belt width direction, the multiple elements 62 are effectively prevented from being inclined to be close to one another on one end in the belt width direction and to be away from one another on the other end, and the compression load applied to the stacked body of the elements 62 in the thickness adjusting step can be made small.

(Fifth Embodiment)

Figure 9A:
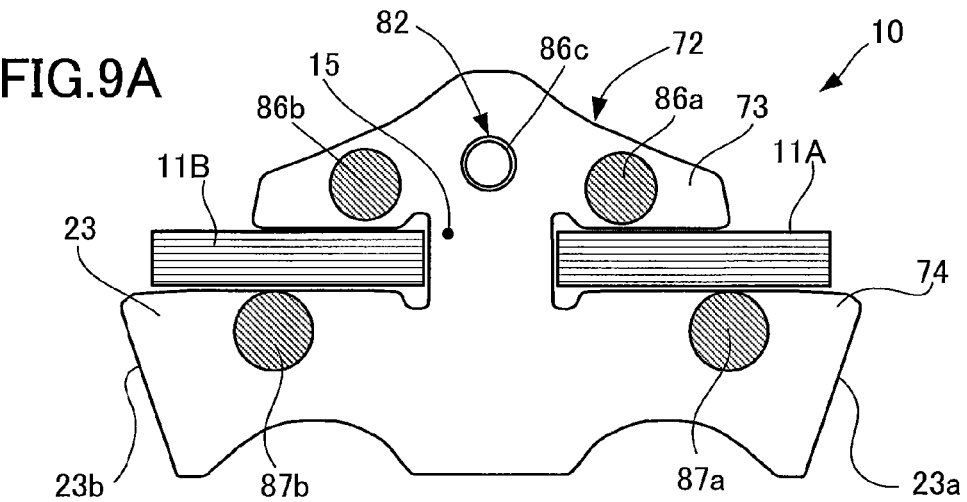
FIG. 9A is a rear view of an element forming part of a power transmission belt according to the fifth embodiment of the present invention.
Figure 9B:
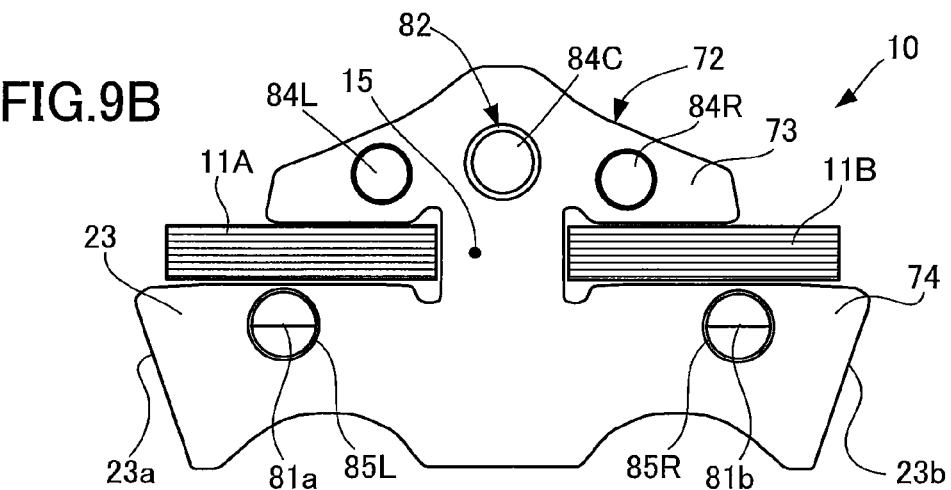
FIG. 9B is a front view of an element forming part of a power transmission belt according to the fifth embodiment of the present invention.
Figure 9C:
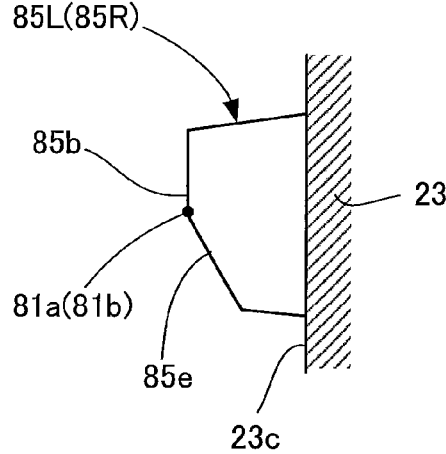
FIG. 9C is an enlarged and fragmentary side cross-sectional view of a second projection portion formed on the element of the power transmission belt according to the fifth embodiment of the present invention.
Figure 10:
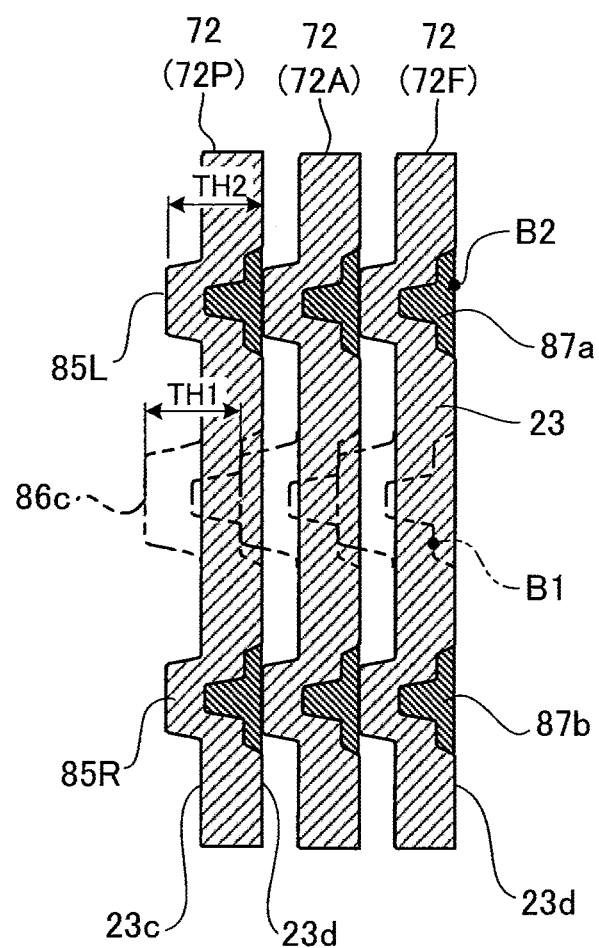
FIG. 10 is a plane cross-sectional view of the central positions of the second convex portion of a plurality of neighboring elements forming part of the power transmission belt according to the fifth embodiment of the present invention.

FIGS. 9A to 9C, together with FIG. 10, illustrate a power transmission belt according to a fifth embodiment of the present invention.

The power transmission belt 10 of the present embodiment is constructed by assembling a plurality of elements 72 illustrated in FIGS. 9A to 9C with the endless band-like rings 11A, 11B. Each of the elements 72 has the plate-like portion 23 having the both side end surface portions 23a, 23b, a plurality of first convex portions 84C, 84L, 84R projecting from the one surface 23c of the plate-like portion 23 by the projection height h1 towards either one of a pair of other elements 72P, 72F, for example, the element 72P on preceding side, neighboring the front and rear surfaces 23c, 23d of the plate-like portion 23 and in a spaced relationship from one another in the belt width direction, and a plurality of second convex portions 85L, 85R in a spaced relationship with the first convex portions 84C, 84L, 84R in the belt thickness direction (up and down direction in FIGS. 9A and 9B), projecting from the one surface 23c of the plate-like portion 23 in a spaced relationship with one another in the belt width direction, in a roughly cylindrical or roughly circular truncated cone shape, and forming left and right rocking edge portions 81a, 81b on the same axis line.

In the present embodiment, each of the elements 72 has a head portion 73 having the first convex portions 84C, 84L, 84R, a body portion 74 having the second convex portions 85L, 85R, and the neck portion 15 connecting the head portion 73 and the body portion 74, and both the first convex portions 84C, 84L, 84R and the second convex portions 85L, 85R are constructed by a plurality of projections in a spaced relationship with one another in the belt width direction. The endless band-like rings 11A, 11B are inserted between the body portion 74 and the head portion 73 set with a predetermined small clearance.

On the back side of the first convex portion 84C in the center of the first convex portions 84C, 84L, 84R, a first concave portion 86c is formed in a circular concave shape such that the depth dp1 of the first concave portion 86c from the other surface 23d of the plate-like portion 23 is smaller than the projection height h1 of the first convex portion 84C from the one surface 23c of the plate-like portion 23, and the first convex portion 84C and the first concave portion 86c constitute as a whole a concave-convex engagement portion 82 for aligning the neighboring multiple elements 72.

Meanwhile, as depicted in FIG. 10, on the back sides of the first convex portions 84L, 84R on both sides in the belt width direction out of the first convex portions 84C, 84L, 84R, soft receiving plate members 86a, 86b made of a material softer than the plate-like material 20 for producing the elements 72 are provided. These soft receiving plate members 86a, 86b are integrally attached on the other surface 23d side of the plate-like portion 23 so as to be filled inside the circular concave portions (no reference numeral) recessed from the other surface 23d of the plate-like portion 23 towards the one surface 23c side. In the rectilinear section of the power transmission belt 10, the first convex portions 84L, 84R of each of the elements 72 are adapted to abut on the soft receiving plate members 86a, 86b so as to impart the pressing force in the driving direction to the head portion 73 of the preceding element 72P.

Similarly, on the back side of the second convex portions 85L, 85R, soft receiving plate members 87a, 87b made of a material softer than the plate-like material 20 are provided, and the soft receiving plate members 87a, 87b are integrally attached on the other surface 23d side of the plate-like portion 23 so as to be filled inside the circular concave portions (no reference numeral) recessed from the other surface 23d of the plate-like portion 23 towards the one surface 23c side. In the rectilinear section of the power transmission belt 10, the second convex portions 85L, 85R of each of the elements 72 are adapted to abut on the soft receiving plate members 87a, 87b so as to impart the pressing force in the driving direction to the body portion 74 of the preceding element 72P.

Further, each of the second convex portions 85L, 85R has a leading end pressing surface portion 85b that abuts on the respective soft receiving plate members 87a, 87b on the back side of the preceding element 72P in the rectilinear section of the power transmission belt 10 to impart the pressing force in the driving direction to the body portion 74 of the preceding element 72P and an inclined surface 85e that forms the respective rocking edge portions 81a, 81b between the leading end pressing surface 85b and the inclined surface 85e and restricts excessive tilt between the neighboring elements 72 in the curved section of the power transmission belt 10.

Other constructions are the same as those of the first embodiment described above.

In the present embodiment, by forming the first convex portions 84C, 84L, 84R and the second convex portions 85L, 85R into the required heights h1, h2 and the thicknesses TH1, TH2, the same effects as those of the first embodiment can be expected. In addition, similarly to the forming of a rocking edge portion in a wide range in the belt width direction, a plurality of short rocking edge portions 81a, 81b allow the elements 72 to stably rock when wound around the pulleys 2, 3 and to stably transmit the pressing force in the rectilinear section.

(Sixth Embodiment)

Figure 11:
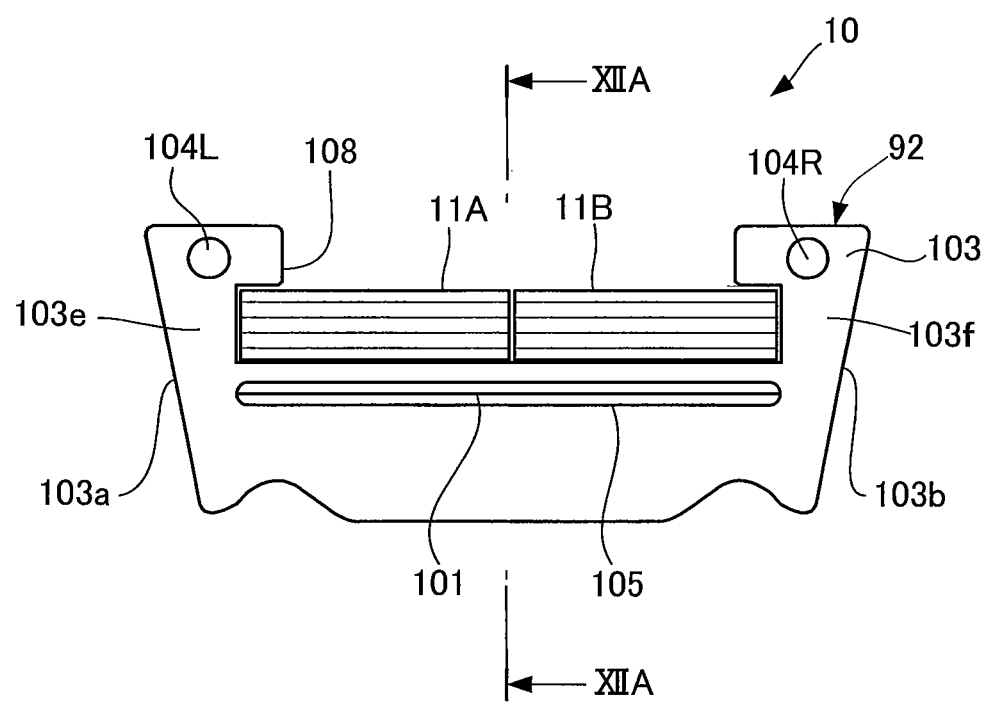
FIG. 11 is a front view of an element forming part of a power transmission belt according to the sixth embodiment of the present invention.
Figure 12A:
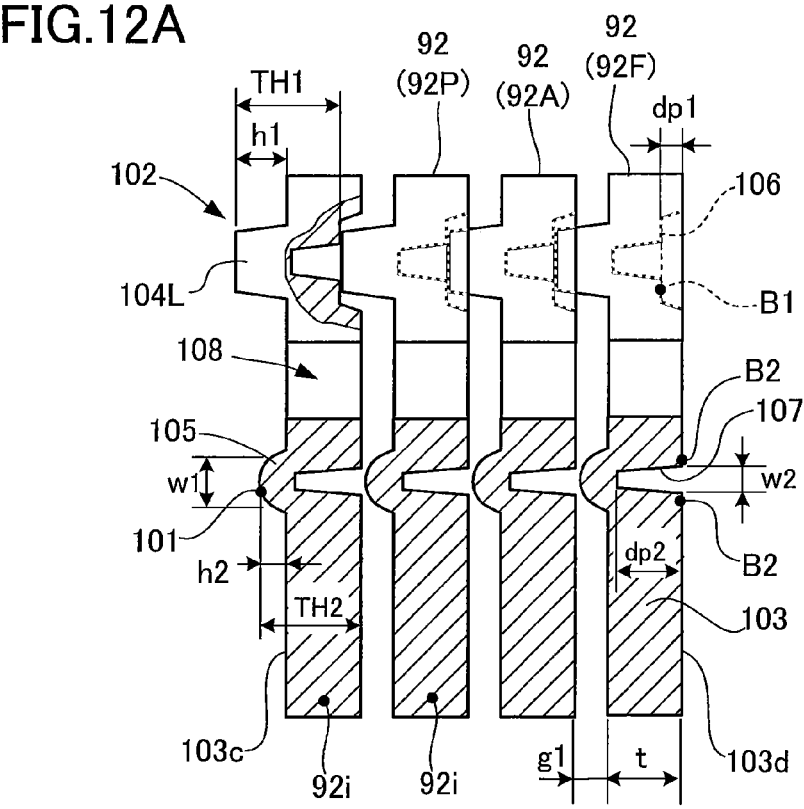
FIG. 12A is a cross-sectional view taken along the line XIIA-XIIA of FIG. 11 and seen in the direction shown by arrows from the line XIIA-XIIA and showing a plurality of elements in an assembled state at the rectilinear section of the power transmission belt according to the sixth embodiment of the present invention.
Figure 12B:
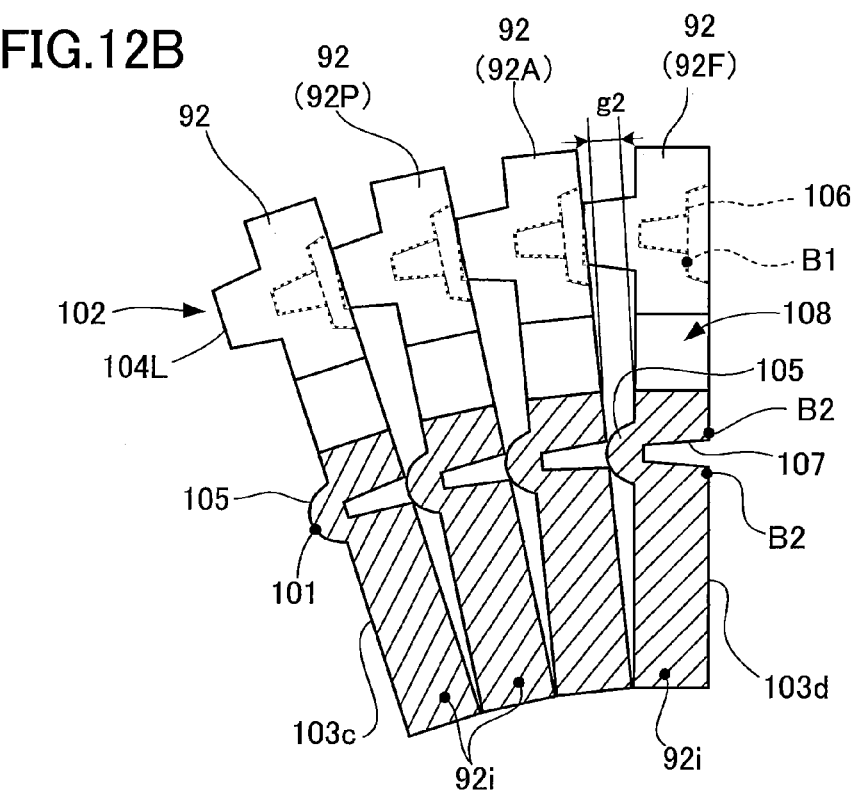
FIG. 12B is a side cross-sectional view of the elements in the assembled state at the curved section of the power transmission belt according to the sixth embodiment of the present invention.

FIGS. 11, 12A and 12B illustrate a power transmission belt according to a sixth embodiment of the present invention.

As depicted in FIGS. 11, 12A and 12B, the power transmission belt 10 of the present embodiment includes two pieces of endless band-like rings 11A, 11B arranged in a double row, and a plurality of elements 92 bound in an annular shape via the endless band-like rings 11A, 11B by being stacked in the thickness direction along the endless band-like rings 11A, 11B and assembled with the endless band-like rings 11A, 11B to rock in the thickness direction.

The elements 92 are each punched from a relatively hard steel plate such as a tool steel plate in a profile shape depicted in FIG. 11 and formed with the rocking edge portion 101 and the concave-convex engagement portion 102 in precise shapes, and are produced by press work that enables precise composite forming such as fine blanking.

Each of the elements 92 has a plate-like portion 103 having both side end surface portions 103a, 103b engageable with the primary pulley 2 and the secondary pulley 3, first convex portions 104L, 104R projecting from one surface 103c of the plate-like portion 103 towards either one of a pair of other elements 92P, 92F neighboring the front and rear surfaces 103c, 103d of the plate-like portion 103, and a second convex portion 105 in a rib shape projecting from the one surface 103c of the plate-like portion 103 in a spaced relationship with the first convex portions 104L, 104R to constitute the rocking edge portion 101. Each of the elements 92, i.e., an arbitrary element 92A, is arranged to engage with the pair of other elements 92P, 92F in such a manner that each of the elements 92 is allowed to press against one another by the first convex portions 104L, 104R and the second convex portion 105.

The first convex portions 104L, 104R are disposed on the outer circumference side of the endless band-like rings 11A, 11B and the second convex portion 105 is disposed on the inner circumference side of the endless band-like rings 11A, 11B. The plate-like portion 103 has an accommodating concave portion 108 accommodating the endless band-like rings 11A, 11B between the first convex portions 104L, 104R and the second convex portion 105, and both arm portions 103e, 103f on both sides thereof in the width direction of the endless band-like rings 11A, 11B in a hook shape binding the endless band-like rings 11A, 11B in the accommodating concave portion 108. The endless band-like rings 11A, 11B are inserted juxtaposed in parallel with each other in the accommodating concave portion 108 of the plate-like portion 103 set with a predetermined small clearance.

As illustrated in FIG. 12A depicting the first convex portion 104L on one side, a first concave portion 106 is formed in a circular concave shape on the back side of each of the first convex portions 104L, 104R such that the depth dp1 from the other surface 103d of the plate-like portion 103 (depth of the rear surface B1) is smaller than the projection height h1 of the first convex portions 104L, 104R from the one surface 103c of the plate-like portion 103. The first convex portions 104L, 104R and a pair of first concave portions 106 corresponding thereto constitute as a whole a concave-convex engagement portion 102 for aligning the neighboring elements 92.

The second convex portion 105 of each of the elements 92 is adapted to abut on the rear surface B2 of the neighboring preceding other element 92P by the rocking edge portion 101 on the outer circumference side of the power transmission belt 10 and to support the pressing load in the driving direction in the rectilinear section of the power transmission belt 10 together with the first convex portions 104L, 104R. The plate-like portion 103 of each of the elements 92 has a second concave portion 107 behind the second convex portion 105 corresponding to the second convex portion 105. The second concave portion 107 has the opening width w2 in the up and down direction in FIG. 11A in which the first convex portions 104L, 104R are spaced apart from the second convex portion 105, and the opening width w2 is arranged to be smaller than at least the width w1 of the leading end portion of the second convex portion 105 in the same direction. The second convex portion 105 is in a rib shape extending in the belt width direction and the second concave portion 107 is in a groove form extending in the belt width direction.

The projection height h2 of the second convex portion 105 corresponding to the height of the rocking edge portion 101 from the one surface 103c of the plate-like portion 103 is set similarly to that of the first embodiment. When the power transmission belt 10 is wound around the primary pulley 2 or the secondary pulley 3, the arbitrary element 92A entering the curved section and the pair of other elements 92P, 92F neighboring on the front and rear surface side of the element 92A are adapted to come close to one another at the inner end portions 92i thereof while they are regulated to tilt excessively from one another.

In the present embodiment, by forming the first convex portions 104L, 104R and the second convex portion 105 into the required heights h1, h2 and the thicknesses TH1, TH2 from the rear surfaces B1, B2, the same functions and effects as those of the first embodiment described above can be obtained.

Moreover, in the present embodiment, the fact that the element 92 is formed in a shape to accommodate the endless band-like rings 11A, 11B in the accommodating concave portion 108 and the both side end surface portions 103a, 103b are formed over the whole height region makes it possible to achieve the power transmission belt 10 to be thin profile.

In each of the foregoing embodiments, while each of the first convex portions and the second convex portions is projection formed from a material of a small thickness, it is naturally conceivable to fix the first convex portions and the second convex portions on the plate-like portion and to form receiving surfaces made of surface material behind the first convex portions and the second convex portions to receive the pressing load. The rocking edge portion can be made to be an edge portion of a smaller corner radius than that exemplified in the first embodiment. Furthermore, while the first convex portion and the second convex portion are exemplified as projections in a rib shape (protrusion) or as a plurality of projections in a roughly cylindrical or roughly circular truncated cone shape in parallel with the rocking edge portion in spaced relationship with one another in the belt width direction, the first convex portion and the second convex portion may be a plurality of projections divided on both sides in the belt width direction and positioned in the same straight line, and the first concave portion and the second concave portion may be a plurality of grooves corresponding to the respective projections.

As will be understood from the foregoing description, in the power transmission belt of the present invention, the fact that the first convex portion and the second convex portion are formed into the required heights allows the difference in the thickness of the element on both sides in the belt width direction to be sufficiently reduced, and makes the thickness of the element not necessarily be as thick as the height of the rocking edge portion, thereby allowing a lightweight element to be produced at low cost and further making it possible to provide a power transmission belt that can adequately ensure the durability of the belt type power transmission mechanism. In the method of producing the power transmission belt according to the present invention, appropriately setting the projection heights of the first convex portion and the second convex portion makes it possible to produce the elements of different thicknesses from a material of the same thickness, and applying a compression load larger than the pressing load between the elements after assembled but in a degree in which the projection height of the first convex portion and/or the second convex portion can be adjusted to the stacked elements after punching makes it possible to reduce the difference in the thickness of the elements on both sides in the belt width direction and to make their thicknesses uniform, thereby allowing a lightweight element to be produced at low cost and making it possible to produce the power transmission belt that can adequately ensure the durability of the belt type power transmission mechanism. The present invention has an effect of realizing the above power transmission belt and the method of producing the same, and is generally useful for the power transmission belt suitable for the belt type continuously variable transmission and the method of producing the same.

Reference Signs List
1: continuously variable transmission (power transmission mechanism)
2: primary pulley (drive side pulley)
3: secondary pulley (driven side pulley)
10: power transmission belt
11A, 11B: endless band-like ring
12, 32, 42, 62, 72, 92: element
12A, 32A, 42A, 62A, 92A: element (arbitrary element)
12P, 32P, 42P, 62P, 72P, 92P: element (preceding element of a pair of other neighboring elements)
12F, 32F, 42F, 62F, 72F, 92F: element (following element of a pair of other neighboring elements)
12i, 32i, 42i, 92i: inner end portion
13, 43, 63, 73: head portion
14, 34, 74: body portion
15: neck portion
20: material (plate-like material)
20w: plate-like portion setting area
21, 81a, 81b, 101: rocking edge portion
22, 52, 55, 82, 102: concave-convex engagement portion
23, 103: plate-like portion
23a, 23b, 103a, 103b: both side end surface portion
23c, 103c: one surface (front surface)
23d, 103d: the other surface (rear surface)
23e, 85e: inclined surface
24, 44, 53, 54, 84C, 84L, 84R, 104L, 104R: first convex portion
25, 45, 85L, 85R, 105: second convex portion 26, 46, 56, 86c, 106: first concave portion
27, 47, 107: second concave portion
45a: load supporting portion
85b: leading end pressing surface portion
86a, 86b, 87a, 87b: soft receiving plate member
103e, 103f: arm portion (both arm portions in a hook shape)
108: accommodating concave portion
dp1, dp2: depth (recessed depth from the other surface of plate-like portion)
F1, F2, F3, F4: compression load
h1, h2: height (projection height from one surface of plate-like portion)
P1a, P1b, P2a, P2b: pressing point
g1: gap (difference between the height of first convex portion and the depth of first concave portion)
g2: gap
w1: width (width of second convex portion in belt thickness direction)
w2: opening width (opening width of second concave portion)

The invention claimed is:

1. A power transmission belt, comprising:
an endless band-like ring, and
a plurality of elements stacked and bonded in pressable relationship with one another through the endless band-like ring,
each of the elements, respectively, having both side end surface portions at its both ends in the belt width direction to be held in pressing engagement with pulleys, a rocking edge portion rockably engaged with either one of a pair of other elements adjacent to the both side surfaces of the element, and a concave-convex engagement portion engageable in concave and convex relationship with the pair of other elements,
each of the elements including a plate-like portion having the both side end surface portions, a first convex portion projecting from one surface of the plate-like portion toward either one of the pair of other elements, and a second convex portion projecting from the one surface of the plate-like portion to be in spaced relationship with the first convex portion to constitute the rocking edge portion projecting from at least one surface of the plate-like portion to both sides of the slate-like portion in the belt width direction,
each of the elements and the pair of other elements being engaged in pressable relationship with one another by the first convex portion and the second convex portion, and
a projection height of the first convex portion from the one surface of the plate-like portion is larger than a projection height of the second convex portion from the one surface of the plate-like portion.

2. The power transmission belt as set forth in claim 1, in which the plate-like portion has a first concave portion formed behind the first convex portion, the first concave portion having a depth from the other surface of the plate-like portion smaller than the projection height of the first convex portion,
the concave-convex engagement portion being constituted by the first convex portion and the first concave portion.

3. The power transmission belt as set forth in claim 1, in which each of the elements has a head portion having the first convex portion, a body portion having the second convex portion, and a neck portion connecting the head portion and the body portion,
at least one of the first convex portion and the second convex portion being in a rib shape extending in the belt width direction.

4. The power transmission belt as set forth in claim 1, in which each of the elements has a head portion having the first convex portion, a body portion having the second convex portion, and a neck portion connecting the head portion and the body portion,
at least one of the first convex portion and the second convex portion being constituted by a plurality of projections spaced apart from one another in the belt width direction.

5. The power transmission belt as set forth in claim 1, in which the plate-like portion has a second concave portion behind the second convex portion and corresponding to the second convex portion,
the second concave portion having an opening width in the direction in which the first convex portion is spaced apart from the second convex portion, the opening width of the second concave portion being smaller than the width of the second convex portion at least in the same direction as the direction in which the first convex portion is spaced apart from the second convex portion.

6. The power transmission belt as set forth in claim 5, in which the second convex portion is in a rib shape extending in the belt width direction, and the second concave portion is in a groove shape extending in the belt width direction.

7. The power transmission belt as set forth in claim 5, in which the second convex portion is constituted by a plurality of projections spaced apart from one another in the belt width direction, and the second concave portion is constituted by a plurality of concave portions spaced apart from one another in the belt width direction.

8. The power transmission belt as set forth in claim 1, in which each of the elements has an engagement portion formed at the end portion opposite to the first convex portion with respect to the rocking edge portion and engageable with the pair of other elements when the elements rock so as to wind around each of the pulleys, the engagement portion having one surface inclined with respect to the one surface of the plate-like portion.

9. A method of producing a power transmission belt including an endless band-like ring, and a plurality of elements stacked in the thickness direction thereof along the endless band-like ring and assembled with the endless band-like ring to be rockable in the thickness direction thereof, each of the elements being formed with a rocking edge portion rockably engaged with either one of a pair of other elements neighboring both end surfaces of the element, and a concave-convex engagement portion engageable in concave and convex relationship with the pair of other elements,
the method comprising a press forming step of punching a plate-like portion having both side end portions from a plate-like material, and forming a first convex portion projecting from one surface of the plate-like portion toward either one of the pair of other elements and a second convex portion projecting from the one surface of the plate-like portion to be in spaced relationship with the first convex portion to constitute the rocking edge portion projecting from at least one surface of the plate-like portion to both sides of the plate-like portion in the belt width direction, and
wherein a projection height of the first convex portion from the one surface of the plate-like portion is larger than a projection height of the second convex portion from the one surface of the plate-like portion.

10. The method of producing a power transmission belt, as set forth in claim 9, further comprising a thickness adjusting step of stacking a plurality of workpieces formed with the first convex portion and the second convex portion on the plate-like portion in the press forming step, applying to the plurality of stacked workpieces a compression load capable of partly plastically deforming at least one of the first convex portion and the second convex portion, and adjusting the thickness of the stacked workpieces within a predetermined thickness range.

11. The method of producing a power transmission belt, as set forth in claim 10, in which the thickness adjusting step further includes measuring the thicknesses of the stacked workpieces at the both sides thereof in the belt width direction, and applying the compression load to the stacked workpieces so that a difference between the thicknesses of the stacked workpieces at the both sides thereof is within a predetermined allowable range.

12. The method of producing a power transmission belt, as set forth in claim 9, in which the press forming step further includes forming a second concave portion behind the second convex portion, the second concave portion having an opening width in a direction in which the first convex portion is spaced apart from the second convex portion, the opening width of the second concave portion being smaller than the width of the second convex portion in the same direction as the direction in which the first convex portion is spaced apart from the second convex portion.

* * * * *